United States Patent [19]
Schnell

[11] Patent Number: 5,923,654
[45] Date of Patent: Jul. 13, 1999

[54] NETWORK SWITCH THAT INCLUDES A PLURALITY OF SHARED PACKET BUFFERS

[75] Inventor: Arnold Thomas Schnell, Austin, Tex.

[73] Assignee: Compaq Computer Corp., Houston, Tex.

[21] Appl. No.: 08/637,521

[22] Filed: Apr. 25, 1996

[51] Int. Cl.$^6$ ................................................ H04L 12/56
[52] U.S. Cl. ........................................ 370/390; 370/427
[58] Field of Search .................................. 370/412, 413, 370/414, 415, 416, 417, 418, 427, 380, 390

[56] References Cited

U.S. PATENT DOCUMENTS

| | | | |
|---|---|---|---|
| 5,083,265 | 1/1992 | Valiant | 395/800 |
| 5,091,905 | 2/1992 | Amanda | 370/60 |
| 5,179,552 | 1/1993 | Chao . | |
| 5,361,255 | 11/1994 | Diaz et al. . | |
| 5,386,413 | 1/1995 | McAuley et al. | 370/54 |
| 5,414,704 | 5/1995 | Spinney | 370/60 |
| 5,438,567 | 8/1995 | Ikeda | 370/417 |
| 5,451,936 | 9/1995 | Yang et al. . | |
| 5,583,861 | 12/1996 | Holden | 370/412 |
| 5,636,210 | 6/1997 | Agrawal | 370/418 |
| 5,764,641 | 6/1998 | Lin | 370/412 |

FOREIGN PATENT DOCUMENTS

0339809 A2  4/1989  European Pat. Off. .
0658027 A2  11/1994  European Pat. Off. .

OTHER PUBLICATIONS

EPO Search Report dated Jul. 27, 1998.

*Primary Examiner*—Min Jung
*Attorney, Agent, or Firm*—Akin, Gump, Strauss, Hauer & Feld, LLP

[57] ABSTRACT

A network switch for transferring packets of information including a plurality of shared packet buffers for a plurality of network ports. The network switch includes a switch matrix for providing independent input and output data channels between any one of the packet buffers and any of the network ports. The network switch further includes a switch controller for controlling transfer of data packets between the network ports and the packet buffers. In this manner, all of the packet buffers are shared and accessible by any of the network ports through the switch matrix. Each of the packet buffers stores only one data packet at a time, although the packet buffers may also be expanded to store multiple packets. The switch matrix includes an input switch with inputs coupled to the network ports and outputs coupled to the packet buffers and programmable crosspoint connections. Furthermore the switch matrix includes an output switch with inputs coupled to the packet buffers and outputs coupled to the network ports and programmable crosspoint connections. A packet processor is also included for handling new address and for duplicating packets if multicast or broadcast.

21 Claims, 11 Drawing Sheets

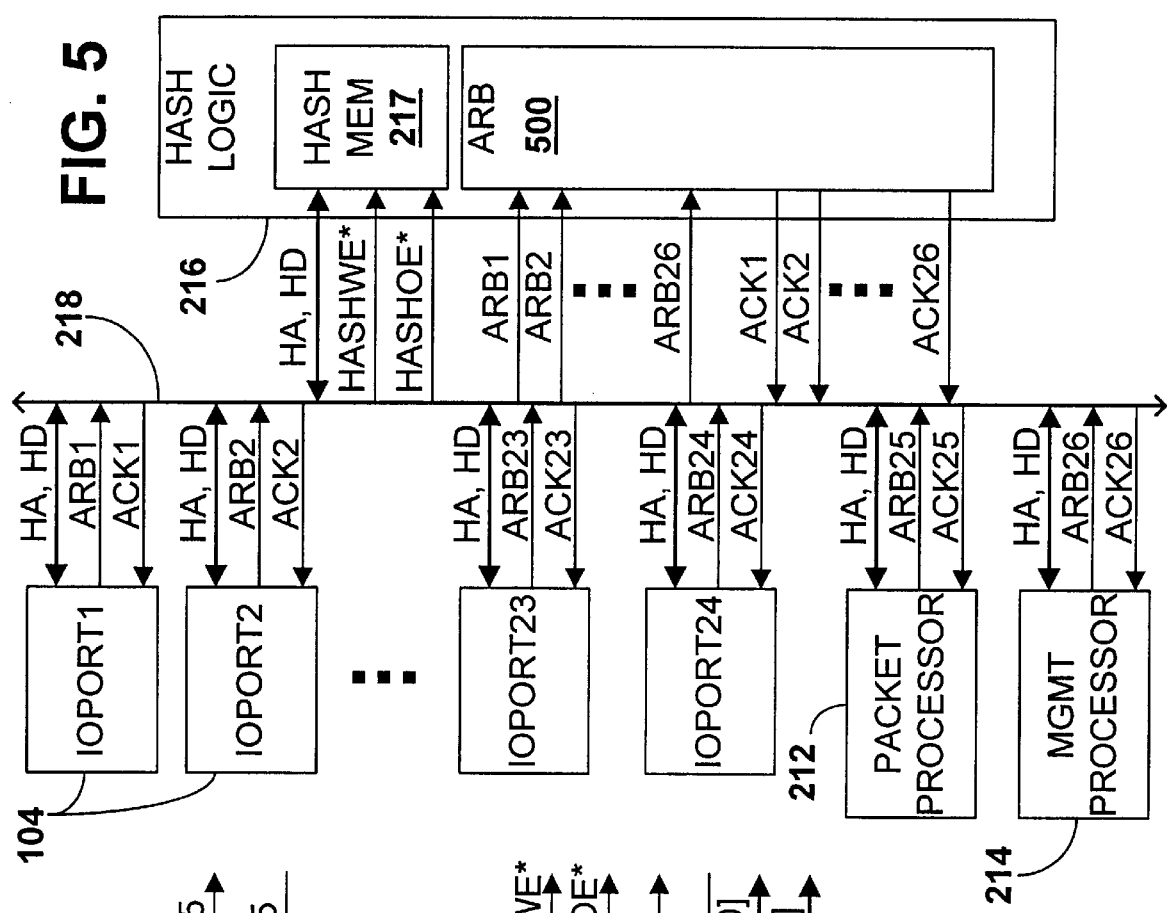
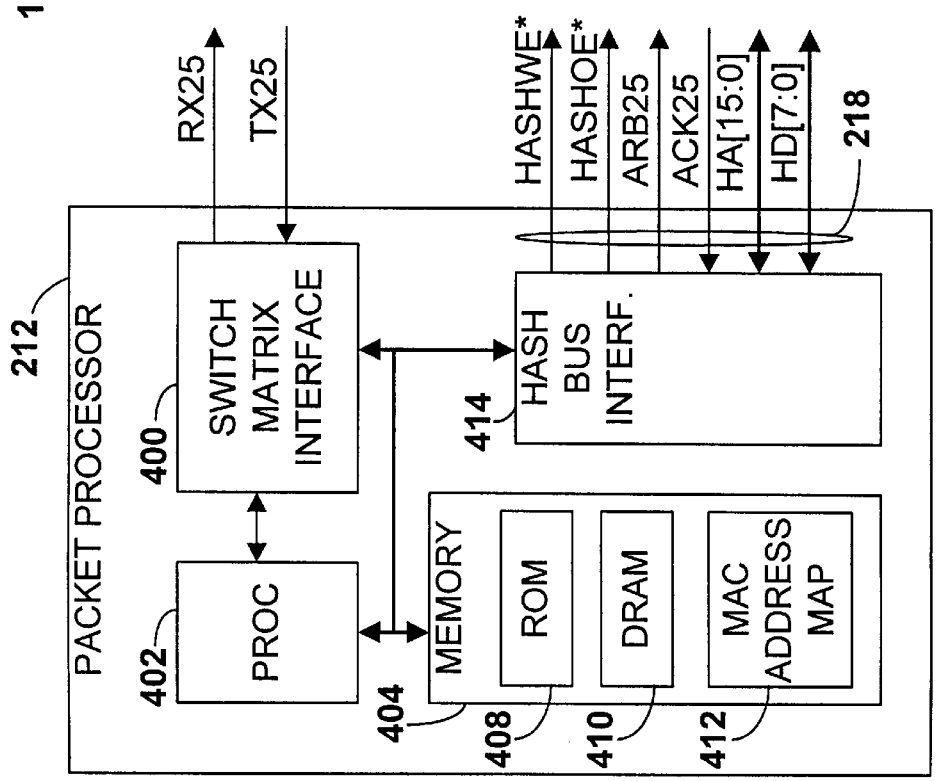

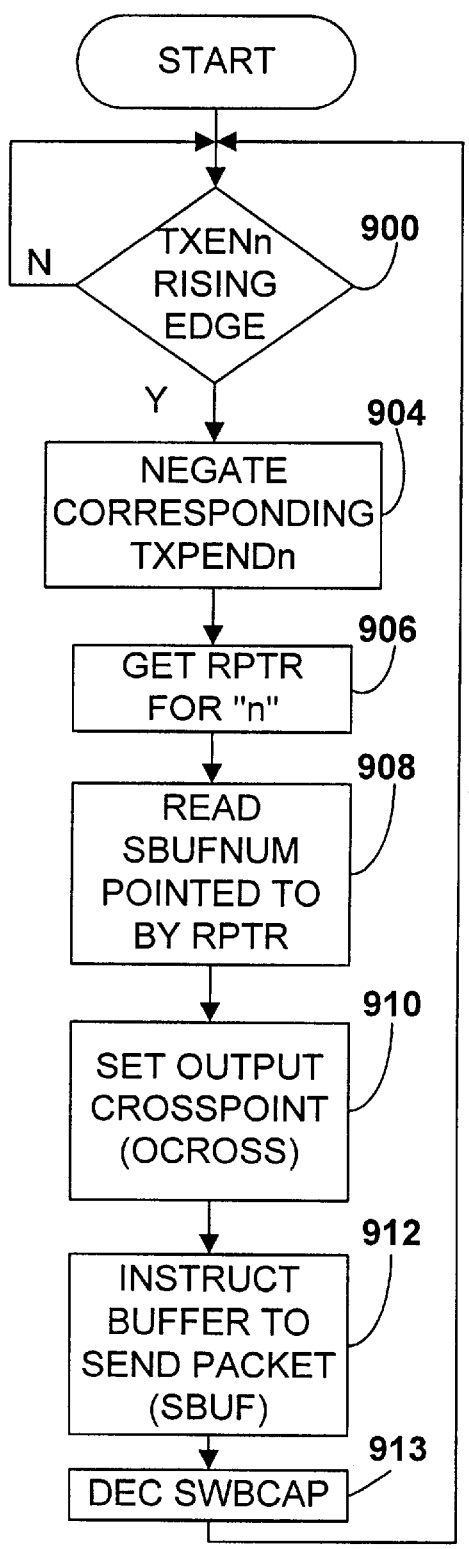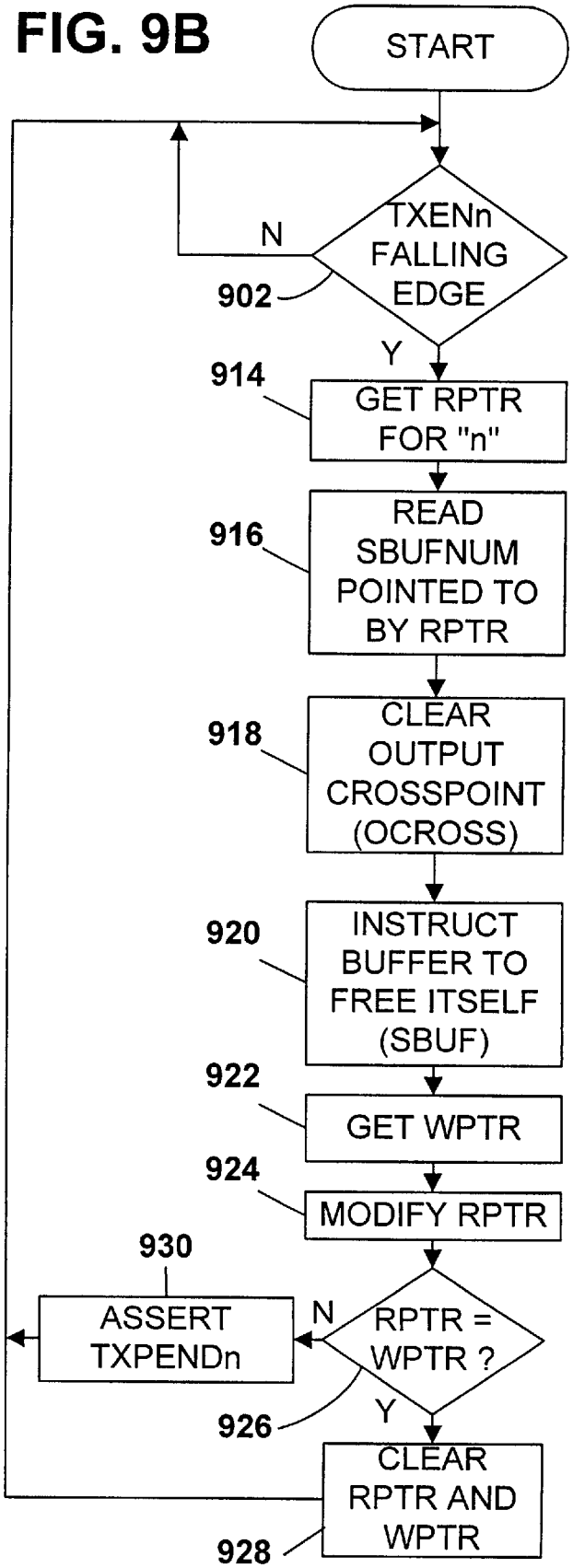
FIG. 9A
FIG. 9B

NETWORK SWITCH THAT INCLUDES A PLURALITY OF SHARED PACKET BUFFERS

FIELD OF THE INVENTION

The present invention relates to the field of networking devices, and more particularly to a network switch for transferring packets of information.

DESCRIPTION OF THE RELATED ART

There are many different types of networks and network systems for sharing files and resources or for otherwise enabling communication between two or more computers. Networks may be categorized based on various features and functions, such as message capacity, range over which the nodes are distributed, node or computer types, node relationships, topology or logical and/or physical layout, architecture based on cable type and data packet format, access possibilities, etc. For example, the range of a network refers to the distance over which the nodes are distributed, such as local-area networks (LANs) within an office or floor of a building, wide-area networks (WANs) spanning across a college campus, or a city or a state, global-area networks (GANs) spanning across national boundaries, etc.

The architecture of a network generally refers to the cabling or media and media access used as well as the packet structure of the data transmitted across the media. Various architectures are common, including Ethernet using coaxial, twisted pair or fiber-optic cables for operation at 10 megabits per second (Mbps) (e.g. 10Base-T, 10Base-F) or fast Ethernet operating at 100 Mbps (e.g. 100Base-T, 100Base-FX). ARCnet (Attached Resource Computer Network) is a relatively inexpensive network architecture using coaxial, twisted pair or fiber-optic cables for operation at 2.5 Mbps. Token Ring topologies use special IBM cable or fiber-optic cable for operation between 1–16 Mbps. Of course, many other types of networks are known and available.

Each network generally includes two or more computers, often referred to as nodes or stations, which are coupled together through selected media and various other network devices for relaying, transmitting, repeating, translating, filtering, etc., the data between the nodes. The term "network device" generally refers to the computers and their network interface cards (NICs) as well as various other devices on the network, such as repeaters, bridges, switches, routers, brouters, to name a few examples.

A network segment is a group of stations that share the same data-link layer using the same data-link layer protocol. The data-link layer is the next layer above the lowest layer of the Open Systems Interconnection (OSI) Reference Model, where the lowest layer is referred to as the physical layer. Ownership of the data-link layer is established in accordance with the protocol, but only one station owns the data-link layer at a time. A network operating according to a given communications protocol may be expanded by using one or more repeaters. A repeater is a hardware device that functions at the physical layer and is used to connect two or more stations of the same network. In particular, a repeater receives packets or data from a data device in one station and re-transmits the packets to another station. Network repeaters support a network segment, but allow a star-wired topology to appear as a single segment. One particular disadvantage of repeaters is that they generate a significant amount of extraneous data traffic, since every data packet is repeated to every other device even though a packet may only be intended for one data device.

A bridge is a hardware device that passes packets from one network segment to another. Bridges also operate at the data-link layer of OSI Reference Model and allow several segments to appear as a single segment to higher level protocols or programs. A bridge serves both as a medium (the bridge part) and as a filter by dropping packets that need not be relayed to other segments. In particular, a bridge provides packet filtering functions that reduce the amount of unnecessary packet propagation on each network segment. For example, a two-port bridge allows connectivity between two separate network segments. If the packet source and destination are on the same network segment, propagation to another segment is avoided, thereby increasing availability of the segment to attached stations. A multi-port bridge extends the two-port bridge to support a greater number of segments.

The networking industry generally uses the terms "bridge" and "switch" interchangeably, since, externally, they perform the same or very similar functions. For example, a switch is similar in function to a multi-port bridge. However, a distinction is made based upon whether a packet passes through a common data path between data ports, which is the case for a bridge, or whether the packet passes through independent, concurrent data paths, referred to as a switch fabric or simply "switches", which is the case for a switch. A bridge interfaces each port to a common processor bus and performs store and forward operations. In particular, a processor receives a packet from one port via a common bus, determines the destination node or station, and re-transmits the packet to the port associated with the destination node via the common bus. In contrast, a switch interfaces each port to a switch fabric, where each port has an independent data channel to the switch fabric.

A switch often must replicate multicast or broadcast packets to several other ports, where such replication is typically performed in the switch fabric. In one approach, the switch fabric simultaneously connected an input port to several output ports. However, this architecture resulted in significant latency since the switch fabric had to wait until all of the output ports were available. In another approach, the switch fabric established a connection to each output port, one at a time, and then sent the packet to the connected output port. Such sequential operation added significant complexity to the switch fabric. Furthermore, multiple broadcast packets received at about the same time often caused bottlenecks and dropped packets.

Switches have included buffers at the input or the output of the switch fabric, so that the buffers were associated with the input or output ports of the switch. Buffers have also been distributed in a Banyan structure switching matrix, but this required several layers of buffers distributed throughout the Banyan structure. Also, buffers within Banyan structures were associated with certain ports and thus are not available to all ports.

It is desired to provide a network switch with improved switching fabric with increased data throughput.

SUMMARY OF THE INVENTION

A network switch for transferring data packets according to the present invention includes a plurality of network ports, a plurality of packet buffers, and a switch matrix coupled to each of the network ports and the packet buffers for providing independent input and output data channels between any one of the packet buffers and any one of the network ports. The network switch further includes a switch controller for controlling transfer of data packets between the network ports and the packet buffers. In this manner, all of the packet buffers are shared and accessible by any of the network ports through the switch matrix. In one embodiment, each of the packet buffers stores only one packet of data at a time, although the packet buffers may be expanded to store multiple data packets.

The switch matrix includes programmable input channel connections for providing at least two simultaneous input data channels and at least two simultaneous output data channels at a time. More particularly, the switch matrix includes an input switch with inputs coupled to the network ports, outputs coupled to respective inputs of the packet buffers and a plurality of programmable crosspoints. Furthermore the switch matrix includes an output switch with inputs coupled to respective outputs of the packet buffers, outputs coupled to the network ports and a plurality of programmable crosspoints. The input switch thus provides a data path between any one of the network ports and any one of the packet buffers. The input switch includes a plurality of programmable data paths for establishing simultaneous data connections between each of the ports with different ones of the buffers. The output switch operates in a similar manner and enables a data path between any one of the packet buffers and any one of the ports. The output switch enables simultaneous data connections between each of the network ports with different ones of the packet buffers at a time.

In the particular embodiment described herein, the switch controller includes input logic for controlling transfer of input data packets, where the input logic determines a free packet buffer and asserts a corresponding buffer number. Each network port indicates a received data packet and prepends an output port number to the received data packet, and the switch matrix receives the buffer number of the free packet buffer and establishes a data channel between the network port which received the data packet and the free packet buffer. The switch matrix indicates to the network port to send the data packet with the prepended output port number, and the switch matrix receives the data packet, retrieves the output port number and provides the output port number to the input logic.

The switch controller further includes output logic for determining if any of the packet buffers has data for any one of the network ports, and if so, the output logic asserts a transmit pending signal. Each of the network ports receives a corresponding transmit pending signal and asserts a corresponding enable signal indicating it is available to receive a data packet. The output logic provides a port number to the switch matrix identifying one of the network ports and provides a buffer number identifying one of said plurality of packet buffers storing data for that network port, where the switch matrix establishes an output data channel between the network port and the packet buffer. The output logic preferably includes logic for commanding each of the packet buffers to transmit a data packet.

The switch controller further includes memory for a packet table which stores buffer numbers corresponding to the packet buffers storing data for the network ports. In the embodiment described herein, the packet table is organized into blocks corresponding to each of the network ports, where each of the blocks includes a circular buffer implemented as a first-in, first-out (FIFO) circular buffer for storing the buffer numbers. The input logic generally builds the packet table while the output logic uses the table to determine the output ports of the data packets.

In the embodiment described herein, the network switch includes a hash memory for storing a table of network port numbers corresponding to hash addresses of the network ports. Each of the network ports includes hash logic for converting a media access control (MAC) address from each data packet into a hash address. Each network port provides the hash address to the hash memory for retrieving a corresponding network port number. The network switch further includes a packet processor for sending data packets to and for receiving data packets from the switch matrix. In particular, the packet processor receives data packets with a new address and duplicates multicast and broadcast data packets.

A network system according to the present invention includes a plurality of external network segments, each including at least one data device for sending and receiving data packets, and a network switch for transferring data packets between the networks. The network switch includes a plurality of network ports, each for coupling to one of the network segments, a packet processor, a plurality of packet buffers, an input switch device with a plurality of inputs coupled to corresponding ones of the network ports and the packet processor, and a plurality of outputs coupled to corresponding ones of the packet buffers. The network switch further includes an output switch device with a plurality of inputs coupled to corresponding ones of the packet buffers and a plurality of outputs coupled to corresponding ones of the network ports and the packet processor, and a switch controller for controlling transfer of packets between the network ports and the packet buffers and between the packet processor and the packet buffers.

A method according to the present invention of transferring a data packet between networks using a network switch including a plurality of network ports, a plurality of packet buffers and a switch matrix, comprises the steps of receiving a data packet from a first network coupled to a first network port for sending to a second network coupled to a second network port of the network switch, identifying an available packet buffer from all of the plurality of packet buffers, establishing an input data channel in the switch matrix between the first network port and the available packet buffer, sending the data packet to the available packet buffer on the input data channel for temporary storage, determining when the second network port is ready to receive the pending data packet, establishing an output data channel between the packet buffer and the second network port, and sending the pending data packet to the second network port on the output data channel.

In this manner, a network switch according to the present invention provides an improved switch fabric by providing shared buffers available to each of the network ports.

BRIEF DESCRIPTION OF THE DRAWINGS

A better understanding of the present invention can be obtained when the following detailed description of the preferred embodiment is considered in conjunction with the following drawings, in which:

FIG. 4 is a simplified block diagram of the packet processor of FIG. 2;

FIG. 5 is a more detailed schematic diagram of the interface between the hash logic, the ports and the processors of FIG. 2;

FIGS. 9A and 9B are flowchart diagrams illustrating operation of the output logic shown in FIG. 6 for controlling output packet flow;

DETAILED DESCRIPTION OF THE PREFERRED EMBODIMENT

Figure 1:
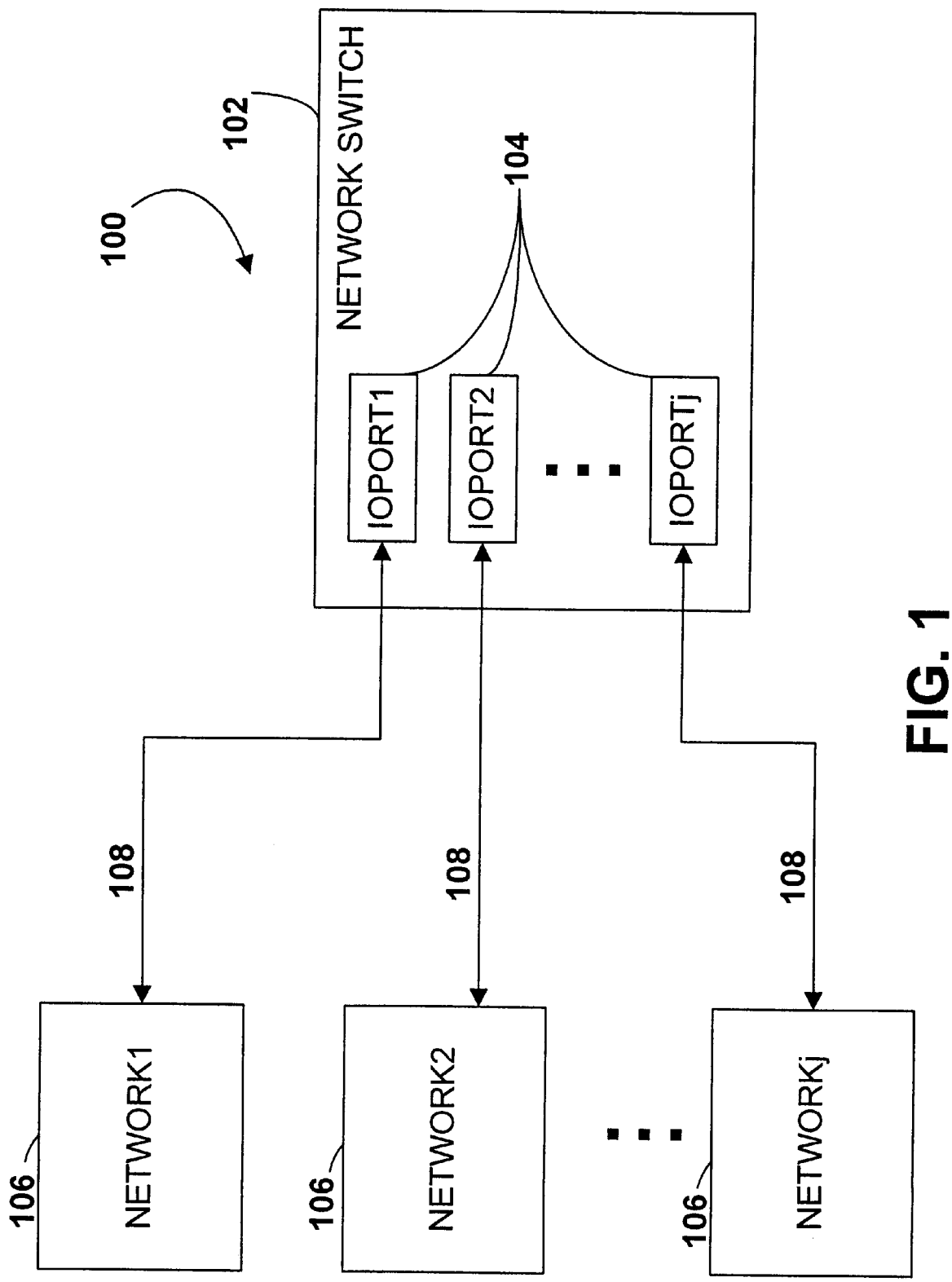
FIG. 1 is a simplified network diagram of a network system including a network switch according to the present invention.

Referring now to FIG. 1, a simplified network diagram is shown of a network system 100 including a network switch 102 implemented according to the present invention. The network switch 102 includes two or more input/output (I/O) ports, or "ioports" 104, each for coupling to and interfacing a network 106 through an appropriate cable segment 108. The ioports 104 are generally referred to as ioports indicative of bidirectional data flow, although each may be referred to as in input port when receiving data from a network 106 or an output port when transmitting data to a network 106. As shown, there are "n" networks 106 individually labeled NETWORK1, NETWORK2, ... NETWORKj, where each network 106 is coupled to the switch 102 through a corresponding one of j ioports 104, individually labeled IOPORT1, IOPORT2, ... , IOPORTj. The network switch 102 may include any desirable number of ioports 104 ports for coupling up to an associated number of networks 106. In the specific embodiment shown, j is an integer number ranging from 1 to 24 for a total of 24 ioports 104 and 24 networks 106.

Each network 106 represents one or more data devices or data terminal equipment (DTE) that allows either input or output of data, or includes any type of network device for connecting together one or more data devices. For example, NETWORK1 may include one or more computers, work stations, file servers, modems, printers, or any other device that receives or transmits data in a network, such as repeaters, switches, routers, hubs, concentrators, etc. In general, each network 106 represents one or more data devices coupled through one or more segments, where the network switch 102 enables communication between any two or more data devices in any of the networks 106.

The network switch 102 operates to receive information from data devices coupled to each of the ioports 104 and to route the information to one or more of the other ioports 104. The network switch 102 also filters the information by dropping or otherwise ignoring information received from a data device in one network 106 that is only intended for data devices in that same network. The data or information is in the form of packets, where the particular form of each packet depends upon the protocol supported by a given network 106. A packet is a predefined block of bytes, which generally consists of header, data, and trailer. The format of a given packet depends on the protocol that created the packet. The header usually includes a source address identifying a data device originating the packet and a destination address identifying the destination data device. The header may further indicate whether the packet is a multicast or broadcast packet intended for multiple destinations.

Figure 2:
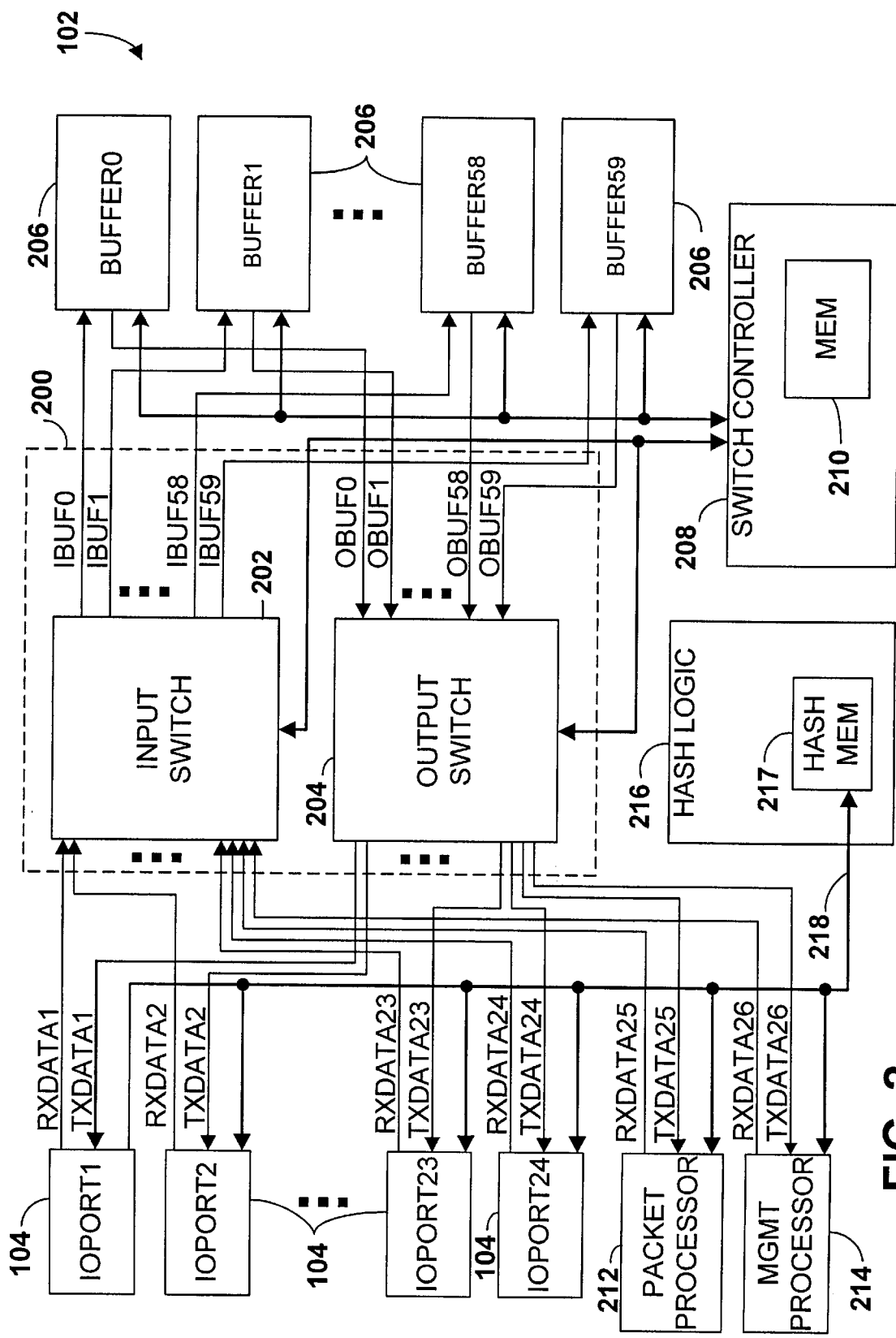
FIG. 2 is a more detailed block diagram of the network switch of FIG. 1.

Referring now to FIG. 2, a more detailed block diagram is shown of the network switch 102. The ioports 104 are essentially identical in structure and function, and are coupled to a switch matrix 200 for receiving and routing data packets. In particular, each ioport 104 provides received or "input" packets to an input switch 202 within the switch matrix 200 on respective data signals RXDATAn, where n is an integer from 1 to 26 corresponding to the particular data signal and port. For example, IOPORT1 provides received data packets on a signal RXDATA1 to one input of the input switch 202, IOPORT2 provides data packets on a signal RXDATA2 to another input of the input switch 202, etc. In a similar manner, each of the ioports 104 has an input for receiving output data packets from an output switch 204 within the switch matrix 200 on corresponding transmit data signals TXDATAn. For example, IOPORT1 receives data packets on a signal TXDATA1 from one output of the output switch 204, IOPORT2 receives data packets on a signal TXDATA2 from another output of the output switch 204, etc. Status and control signals for controlling communication and data transfer between each ioports 104 and the switch matrix 200 are described below.

The input switch 202 has m output signals, collectively referred to as IBUFm, where m is an integer from 0 to 59 identifying individual signals IBUF0, IBUF1, ... IBUF59. The IBUFm signals provide data to respective inputs of m memory packet buffers 206, individually referred to as BUFFERm or BUFFER0, BUFFER1, ... BUFFER59. Thus, in the embodiment shown, there are sixty (60) packet buffers 206, where each has an output for providing data on a corresponding output signal OBUFm to respective inputs of the output switch 204 within the switch matrix 200. In this manner, data packets received through any one of the ioports 104 is directed through the input switch 202 and temporarily stored in one or more of the packet buffers 206, and the data packet is redirected through the output switch 204 to one of the ioports 104 to one or more destination data devices within a network 106. A switch controller circuit 208 is shown coupled to the input switch 202, the output switch 204 and to each of the packet buffers 206 for controlling data flow. The switch controller 208 also asserts and detects other control signals to and from each of the ioports 104 as described further below. The switch controller 208 further includes or is otherwise coupled to a memory 210 for storing a packet table 604 (FIG. 6) and other information for tracking data flow.

A packet processor 212 and a management processor 214 are both coupled to the switch matrix 200 in a similar manner as each of the ioports 104. As described further below, the packet processor 212 and the management processor 214 each appear as additional ports to the switch matrix 200. In particular, the packet processor 212 asserts data on a signal RXDATA25 to a corresponding input of the input switch 202, and receives data on a signal TXDATA25 from a corresponding output of the output switch 204. Likewise, the management processor 214 asserts data on a signal RXDATA26 to a corresponding input of the input switch 202 and receives data on a signal TXDATA26 from a corresponding output of the output switch 204. However, the packet processor 212 and the management processor 214 are not directly connected to any external segments 108. Hash logic 216 is coupled to each of the ioports 104, to the packet processor 212 and to the management processor 214 through a hash bus 218, which includes address, data and control signals. The hash logic 216 includes a hash memory 217, which is implemented using SRAM or the like for storage and retrieval of port number data, as further described below.

The input switch 202 and the output switch 204 each include a plurality of "input" rows for connecting to "output" columns. In this manner, the input switch 202 connects any one of the ioports 104 to any one of the packet buffers 206 forming a serial data channel. Although the input switch 202 connects each of the ioports 104 to only one of the packet buffers 206 at a time, the input switch 202 allows a plurality of simultaneous serial connections between different ioports 104 and different packet buffers 206. Likewise, the output switch 204 connects each of the packet buffers 206 to any one of the ioports 104 and allows a plurality of simultaneous serial connections between different packet buffers 206 and different ioports 104.

Figure 2A:
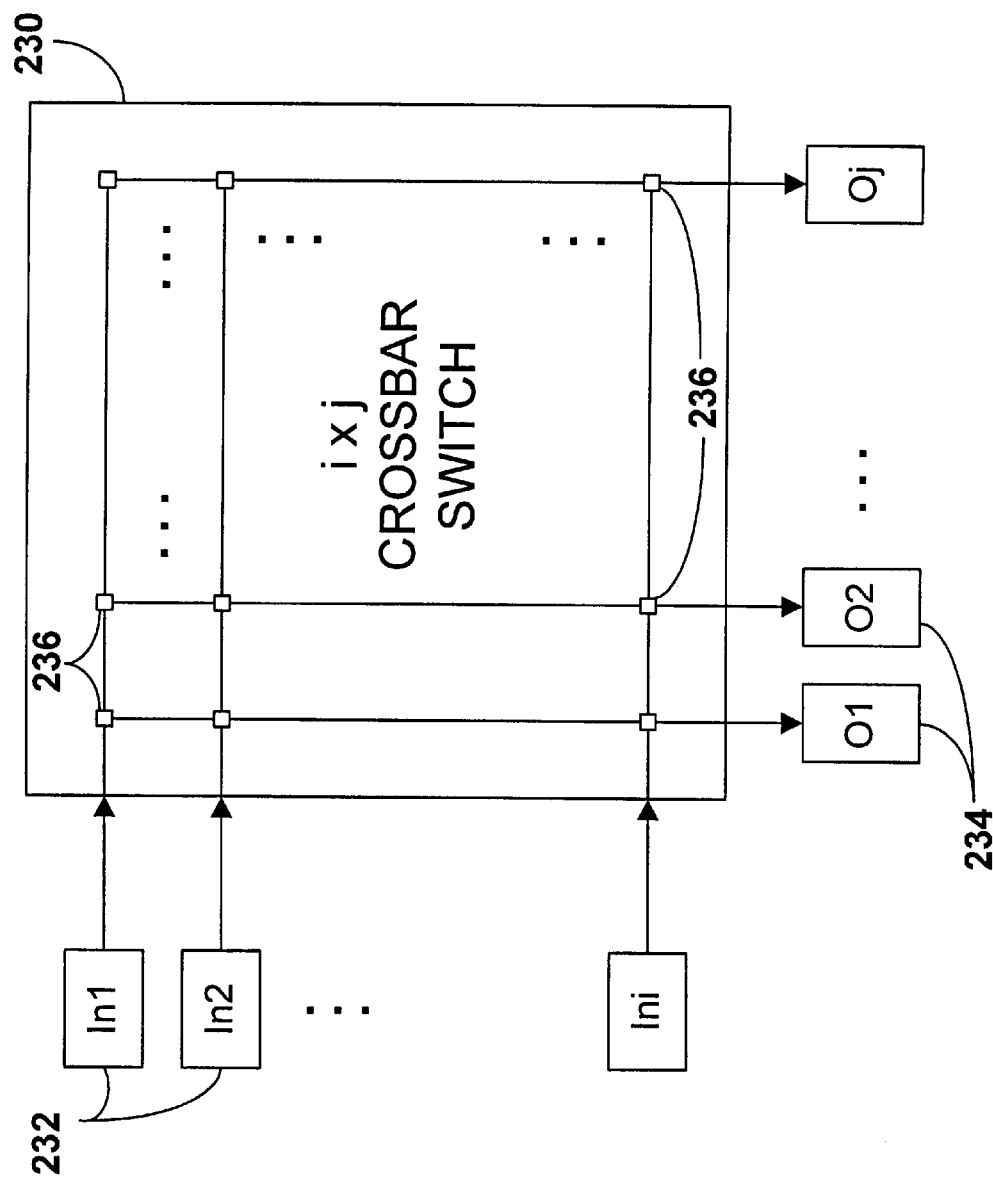
FIG. 2A is a more detailed block diagram of one embodiment of the input and output switches of FIG. 2.

The switches 202 and 204 may be implemented in any desired manner for establishing connections between respective inputs and outputs. FIG. 2A is a block diagram of an i by j crossbar switch 230 for implementing the input and output switches 202, 204 of FIG. 2. The crossbar switch 230 includes i inputs In1, In2, . . . Ini 232 and j outputs O1, O2, . . . Oj 234, where i and j are integers for implementing any number of inputs 232 and outputs 234. For implementing the input switch 202, i ranges from 1 to 26 and j ranges from 0 to 59. For implementing the output switch 204, i ranges from 0 to 59 and j ranges from 1 to 26. The crossbar switch 230 includes a plurality of crosspoint connections 236 for connecting any input 232 to any output 234. The crossbar switch 230 enables simultaneous crosspoint connections between different inputs 232 and different outputs 234, although any particular input 232 is connected to only one output 234 at a time. The input and output switches 202, 204 may be implemented using other switching fabrics, such as Banyan fabric or the like using blocking or non-blocking formats.

Figure 3:
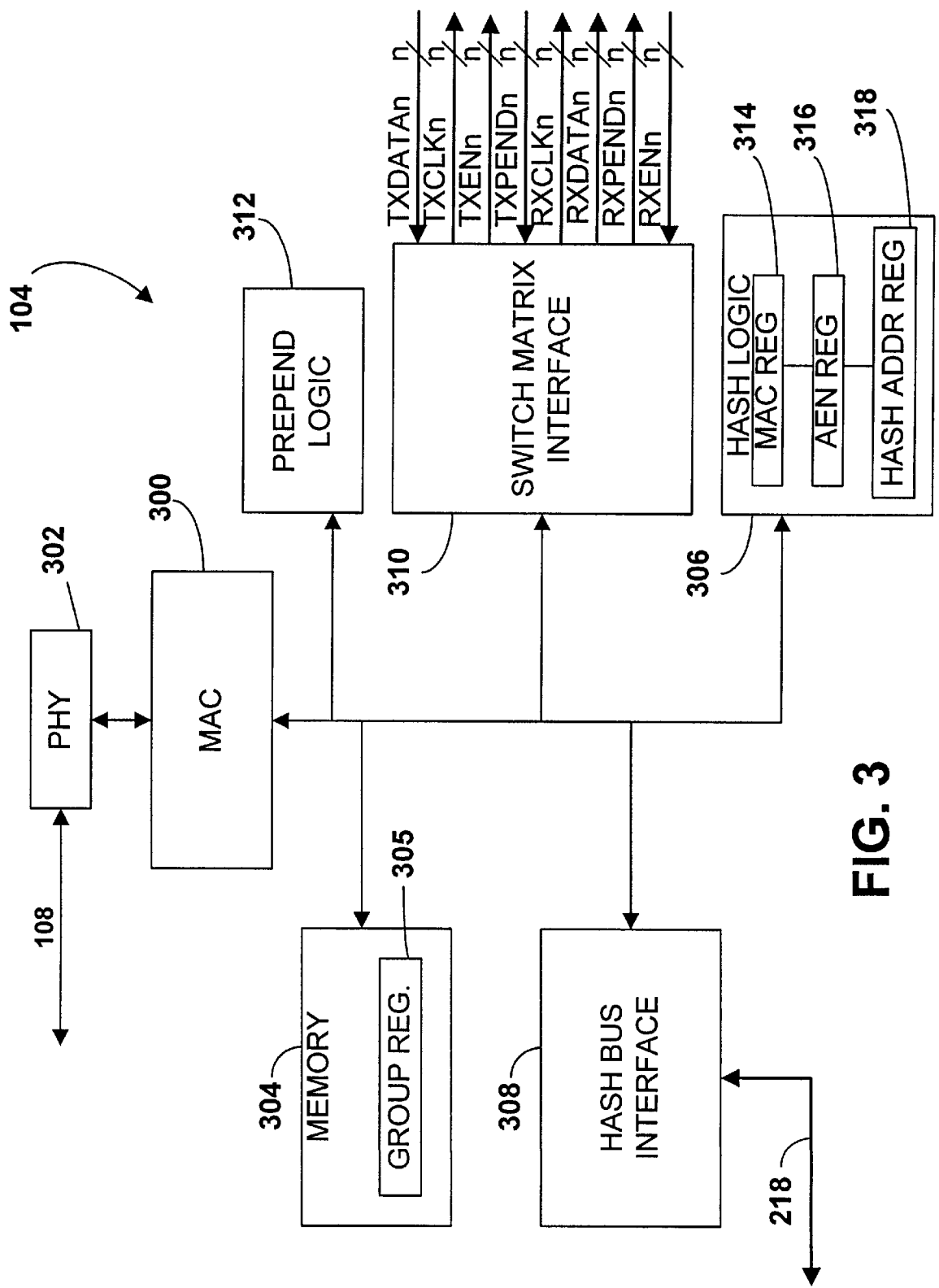
FIG. 3 is a block diagram of one of the ports of the network switch of FIG. 1.

Referring now to FIG. 3, a block diagram is shown representing any one of the ioports 104 for sending and receiving packets of information via the switch matrix 200. Each of the ioports 104 are preferably similar in design and function. A media access control (MAC) device 300 is the primary component for performing MAC functions. The MAC device 300 is protocol specific and operates at the MAC sub-layer, which is the lower sub-layer of the data-link layer of the OSI Reference Model. Examples include the TI Token Ring Eagle, TMS380C25, the AT&T VG node interface chip, 2MD01, a custom designed MAC layer device with optimized interface, etc. A physical interface (PHY) 302 is coupled to the MAC device 300, where the PHY 302 is a protocol specific physical layer device for interfacing with the physical cable of the segment 108. Examples of commercial PHY-type devices include the TI Token Ring Interface Chip, TMS38054, or the AT&T 100VG transceiver, ATT2X01, etc. The appropriate connector is also provided, such as, for example, an RJ-45 jack for interfacing a compatible RJ-45 plug for coupling to twisted-wire pairs. Twisted-wire pairs may be used for a variety of protocols, including various Ethernet standards such as 10Base-T, 100Base-TX, etc.

A memory 304 is coupled to the MAC device 300 for temporarily storing one or more data packets, or portions thereof, while a routing decision is made for those packets.

The memory 304 also stores various other data and parameters as desired, and includes optional registers and buffers for particular implementations. For example, the memory 304 includes an optional n-bit or 24-bit GROUP register 305 if the ioports 104 support input port packet replication. Each of the bits of the GROUP register 305 corresponds to one of the other ioports 104, where each bit is set for corresponding ioports 104 belonging to the same group. If the group function is implemented, then packets received are only relayed to one or more other members of the same group, and are otherwise dropped. A unicast packet, for example, is dropped if its destination address is to an ioport 104 not within the same group as the input port. Multicast and broadcast packets are sent to one or more other ioports 104 belonging to the same group. If the GROUP register 305 is not included or if all of its bits are set or logic one, then the ioport 104 handles packets as further described below.

Routing decisions are primarily performed in hash logic 306, which retrieves the source and destination addresses from each packet for determining to which of the other ioports 104, if any, that the packet should be sent. The hash logic 306 performs a hashing procedure for reducing the bit-size of each address to a smaller value, and for providing the hashed result through a hash bus interface 308 and the hash bus 218 to the hash memory 217. The hash memory 217 returns a port number or value identifying the destination port, if any or one of the processors 212, 214. If any address within the packet is unknown, or if the packet is intended for more than one other ioport 104, then the hash memory 217 returns the port number of the packet processor 212 for handling exceptional cases. As shown in FIG. 2, the port number of the packet processor 212 is 25. A switch matrix interface 310 is provided for interfacing the ioport 104 with the switch matrix 200 through the RXDATAn and TXDATAn signals, as well as other control signals RXPENDn, RXENn, RXCLKn, TXPENDn, TXENn and TXCLKn, described below. Prepend logic 312 is coupled to the packet buffer 304 for prepending bytes of data to each of the input packets as further described below. Although each of the functional logic and memory blocks are shown separated, each of the ioports 104 is implemented and grouped in any suitable fashion, such as several chips, a single, integrated chip or an application specific integrated circuit (ASIC), etc.

The hash logic 306 includes a MAC address register 314 for temporarily storing MAC addresses within packets received from a corresponding network 106. The MAC register 314 includes at least 48 bits ADD[47:0] for storing a MAC address. An address enable (AEN) register 316 is also provided and coupled to the MAC register 314, and also includes 48 bits AEN[47:0], each corresponding to a bit of the MAC register 314. The AEN register 316 stores a programmable enable pattern for selecting bits of the MAC address in the MAC register 314 for providing a hash address stored in a HASH register 318. In the embodiment shown, the initial or default enable pattern is hexadecimal value of 000000007FFFh (h=hexadecimal) for selecting the least significant 15 consecutive bits of the MAC address as the hash address. The enable pattern is modified to optimize hash addresses in the event the default enable pattern results in a significant amount of hash address collisions. Any or pattern of bits may be selected, and the selected bits are consecutive or non-consecutive bits as determined by the packet processor 212. The number of selected bits equals the number of address bits for the hash memory 217, which in the embodiment shown is 15 bits for addressing 32K different addresses.

Referring now to FIG. 4, a simplified block diagram is shown of the packet processor 212. The packet processor 212 generally performs five functions, including packet exception handling, learning bridge, spanning tree algorithm, MAC address map maintenance and hashing optimization, and system overhead. The packet processor 212 includes a switch matrix interface 400 for interfacing with the switch matrix 200 for sending and receiving packets through data signals RXDATA25 and TXDATA25, respectively, while using control signals RXPEND25, RXEN25, RXCLK25, TXPEND25, TXEN25 and TXCLK25, where the data and control signals for receive and transmit are collectively shown as signals RX25 and TX25, respectively. The packet processor 212 includes a processor 402 coupled to the switch matrix interface 400 for performing the functions listed above. A memory 404 is coupled to the processor 402 and the switch matrix interface 400 for storing startup and run-time routines and also for storing and retrieving parameters and data. The memory 404 includes read-only memory (ROM) 408 for storing startup routines to initialize the processor 402 and run-time routines performed by the processor 402. The memory 404 also includes DRAM 410 for storing parameters and data during run-time, and also an DRAM for storing a MAC address map 412 of all MAC addresses received at the ioports 104.

The packet processor 212 also includes a hash bus interface 414 coupled to the switch processor 402 and the memory 404 for interfacing with the hash logic 216 and the hash memory 217 through the hash bus 218. The packet processor 212 asserts a write enable signal HASHWE* to update the hash memory 217 with new addresses when received by any of the ioports 104. Only the packet processor 212 asserts the HASHWE* signal for writing to the hash memory 217, so that the ioports 104 and the management processor 214 only have read access. A signal name followed by an asterisk (*) is considered negative logic, which is considered asserted when low, or at logic zero, and negated when high, or at logic one. Otherwise, signals conform to positive logic and considered asserted when high, or at logic one, and negated when low, or at logic zero. The packet processor 212 asserts an output enable signal HASHOE* to enable the hash memory 217 to assert port numbers and other data on an 8-bit hash data bus HD[7:0]. The ioports 104, the packet processor 212 and the management processor 212 assert hash addresses to the hash memory 217 on a 16-bit hash address bus HA[15:0]. The hash bus interface 414 asserts an arbitration signal ARB25 for arbitrating for the hash bus 218, and an acknowledge signal ACK25 is asserted to grant control of the hash bus 218 to the packet processor 212. Hash bus arbitration is further described below.

During normal operation, 15-bit hash addresses are asserted on the HA[14:0] signals and the HA[15] bit is zero. However, the packet processor 212 assesses the internal registers of the ioports 104 by driving the HA[15] bit of the hash address bus HA[15:0] high and setting the HA[14:10] bits equal to the binary physical port number. For example, the packet processor 212 can query the GROUP register 305, the AEN register 316, the HASH register 318, or any other register within an ioport 104. When HA[15] is high, each ioport 104 compares the HA[14:10] bits with its own port number to determine if the hash bus cycle is directed towards that port. The HA[9:0] signals allow decoding of specific registers within each of the ioports 104.

Each of the ioports 104 receives packets from corresponding networks 106 and retrieves the corresponding source and destination addresses within the packets. The source and destination addresses are typically 48-bit MAC addresses, which, according to industry standards, are guaranteed to be unique. Although there is no particular limit on the number of data devices coupled to any particular ioport 104 of the network switch 102, it is desired that a maximum of approximately 24,000 data devices be coupled to the network switch 102 at a time for performance reasons, for an average of 1,000 data devices per ioport 104. A 15-bit address includes over 32,000 (32K) unique combinations, and thus is sufficient for distinguishing between over 32K total devices coupled through the ioports 104. In general, the lower bits of the MAC address are incremented for each data device, so that the lower 15 bits of the address provides an initial or default hash address. However, the lower 15 bits do not guarantee a unique hash address and can result in an address collision, where the same hash address is generated from two different MAC addresses. If such collision results, then the ioport 104 routes the packet to the packet processor 212 through the switch matrix 200, as further described below.

Generally, the packet processor 212 receives a packet from the switch matrix 200, determines the appropriate action for that packet, and then re-submits that packet to the switch matrix 200 for routing to one of the ioports 104. Packet exception handling includes identification of new MAC addresses and replicating packets to multiple ioports 104 for multiple destinations. The packet processor 212 updates the hash memory 217 with new addresses when received by any of the ioports 104. The learning bridge and spanning tree functions typically conform to the IEEE 802.1 specification for formulating an address to port map structure and identification of which of the ioports 104 are supported by the network switch 102. This information is stored in the MAC address MAP 412. Each of the ioports 104 perform minimal default hashing functions, which may result in the same hashed address for two different hash addresses. The packet processor 212 uses optimization techniques to identify and correct address collisions.

The MAC address map 412 is a linked list structure including each MAC address received and the corresponding port number associated with that MAC address. For each MAC address, the MAC address map 412 also includes a list of associated MAC addresses, if any, and corresponding port numbers. Each packet indicates whether it is a unicast, multicast, or a broadcast packet. A unicast packet includes one source MAC address and one destination MAC address. A multicast packet also includes a source MAC address, but is associated with a group of individual MAC addresses of other data devices. A broadcast packet is a packet associated with one or more "virtal" segments, such as one or more segments 108. The packet processor 212 initializes the MAC address map 412 and the hash memory 217 upon power up, and then updates the MAC address map 412 and the hash memory 217 for each new packet. The packet processor 212 eventually updates the hash memory 217 to handle most transfers of unicast packets without intervention by the packet processor 212. The packet processor 212 also eventually updates the MAC address map 412 with all of the MAC addresses and ioports 104 associated with each multicast and broadcast packet. The packet processor 212 uses the address map to replicate each multicast and broadcast packet to the appropriate output ports.

The packet processor 212 receives all packets containing new MAC addresses, and updates the MAC address map 412 and the hash memory 217. A new source MAC address is copied into the MAC address map 412 along with its corresponding port number. The port number is also written into the hash memory 217 at a hashed address location if there is no address collision between hashed addresses. In the event of an address collision, the packet processor 212 writes its own port number of 25 into the hash memory 217, so that the next packet with the same hashed address is routed to the packet processor 212. If the packet is a unicast packet and its destination MAC address is unknown, then the packet processor 212 replicates the packet to all of the other ioports 104 other than the input port. Thus, the unicast packet is initially treated as a broadcast packet. For example, if a unicast packet with an unknown destination MAC address is received at IOPORT1, then the packet processor 212 replicates the packet to IOPORT2, replicates the packet to IOPORT3, replicates the packet to IOPORT4, etc., until the packet is repeated to all other IOPORTS 2–24. Eventually, the destination data device receives a copy of the replicated packet and responds with its own source MAC address. Since the source address from the destination data device is "new" in that the hash memory 217 has not yet been updated with the corresponding port number, the packet is routed to the packet processor 212. The packet processor 212 updates the hash memory 217 with the port number. Thereafter, as long as an address collision does not occur and if the address is not intentionally nullified due to other factors such as spanning tree requirements, any unicast packets sent from known source MAC addresses to that same destination data device are routed directly without intervention of the packet processor 212.

Each ioport 104 detects an address collision by querying the hash memory 217 for the port number of an input packet's source MAC address and then comparing the port number received from the hash memory 217 with its own port number. If the port numbers are different, then an address collision has occurred and the input port routes the packet to the packet processor 212. In the embodiment shown, each ioport 104 routes all multicast and broadcast packets to the packet processor 212. Alternatively, the ioports 104 are configured to handle their own multicast and broadcast packets to reduce the processing load of the packet processor 212.

Referring now to FIG. 5, a more detailed schematic diagram is shown of the interface between the hash logic 216, the ioports 104 and the processors 212, 214 through the hash bus 218. Each of the ioports 104 and the processors 212, 214 assert a corresponding arbitration signal ARBn on the hash bus 218 to request ownership of the hash bus 218, where, as before, n is an integer between 1 and 26 identifying the port number or processor. An arbiter 500 within the hash logic 216 receives the ARBn signal and asserts a corresponding acknowledge signal ACKn to grant control of the hash bus 218. Thus, there is one arbitration and one acknowledge signal per ioport 104 and per processor 212, 214. For example, IOPORT1 asserts a signal ARB1 to request control, and the arbiter 500 respondingly asserts a signal ACK1 to grant control of the hash bus 218 to IOPORT1. Only one of the ioports 104 or the processors 212, 214 owns the hash bus 218 at a time, so that only one ACKn signal is asserted at a time. The hash address bus is shown as HA and the hash data bus is shown as HD.

In operation, a ioport 104 receives a packet and arbitrates for the hash bus 218 by asserting its corresponding ARBn signal. In response to its corresponding ACKn signal being asserted and while the ioport 104 owns the hash bus 218, it asserts a hash address on the HA[14:0] signals to the hash memory 217 for both the source MAC address and the destination MAC address in the packet. The hash memory 217 respondingly asserts a byte of information in response to each hash address according to the following Table I:

TABLE I

CONTENTS OF HASH MEMORY 217

| Hash Data | Value | Description |
| --- | --- | --- |
| HD[4:0] | OPNUM | Output port number<br>0 = empty location<br>1–24 = port number<br>25 = Packet Processor 212<br>26 = Management Processor 214 |
| HD[5] | TRFrame | Ethernet or Token Ring<br>0 = Ethernet<br>1 = Token Ring |
| HD[6] | BLOCK | Spanning Tree Function:<br>0 = unblocked<br>1 = blocked |
| HD[7] |  | Undefined | where OPNUM is the number of the ioport 104 associated with the hash address, TRFrame indicates packet type and BLOCK is a spanning tree function. In the embodiment shown, the frame type is either Ethernet or Token Ring, where it is understood that many other types of protocols may be included or substituted as desired. Also, the Ethernet protocol includes a variety of data rates and speeds. Any particular data rate may be used at any particular ioport 104. In fact, hybrid operation is supported where different ioports 104 may operate at different data rates.

The input port compares the OPNUM value for each address with its own port number. If the OPNUM of the destination address is equal to the port number of the input port, then the packet is dropped and ignored. If the OPNUM for the hashed source address equals the port number of the input ioport 104, then the source address has been previously established within the hash memory 217 by the packet processor 212, and no hash address collisions occurred. It is noted, however, that a hash address collision may occur between two data devices in the same network 106 coupled to the same input ioport 104. Although this may result in incomplete data of the MAC address map 214 within the packet processor 212, it is not required to distinguish between two different devices coupled to the same input port since packet routing is the same. If, however, the OPNUM for the hashed source address and the input port number do not match and OPNUM is not zero or 25, then an address collision has occurred between two data devices coupled to different input ports, or a device has been moved from one port to another. In either case, the packet is routed to the packet processor 212 for updating the MAC address map 412 and the hash memory 217. Also, if OPNUM=0 for either the source or the destination address or both, then the packet is routed to the packet processor 212 for initialization of the MAC address map 412 and/or the hash memory 217 for new address(es).

If BLOCK=1, then the ioport 104 drops the packet since this indicates that the network switch 100 does not service that joport 104 according to the spanning tree algorithm. If spanning tree is not implemented, then BLOCK is set to zero. The TRFrame value indicates the destination port requires either Ethernet or Token Ring packet format. If the format received is not the same as the format required at the destination port, the input ioport 104 routes the packet to the management processor 214, if present, or otherwise drops the packet. The management processor 214 converts packet formats as necessary.

If the input port does not drop the packet, then it prepends input and output port information to the packet and transmits the packet to the switch matrix 200. The network switch 100 uses the prepended information to further process and route the packet to the desired output port or processor. The prepended information, referred to as PREPEND[], is arbitrarily two bytes in length according to the format provided in the following Table II:

TABLE II

CONTENTS OF PREPENDED INFORMATION
APPENDED TO PACKETS

| Bit(s) | Value | Description |
| --- | --- | --- |
| PREPEND[15] | Always '1' | Lead bit identifying start of packet |
| PREPEND[14:10] | OPNUM | Output port number |
| PREPEND[9:8] | PRIORITY | Optional priority level |
| PREPEND[7] | Format | 1 = Token Ring |
|  |  | 0 = Ethernet |
| PREPEND[6] | BPDU | Configuration message: |
|  |  | 0 = not a configuration message |
|  |  | 1 = configuration message |
| PREPEND[5:1] | IPNUM | Input port number |
| PREPEND[0] | 0 | Undefined |

Figure 6:
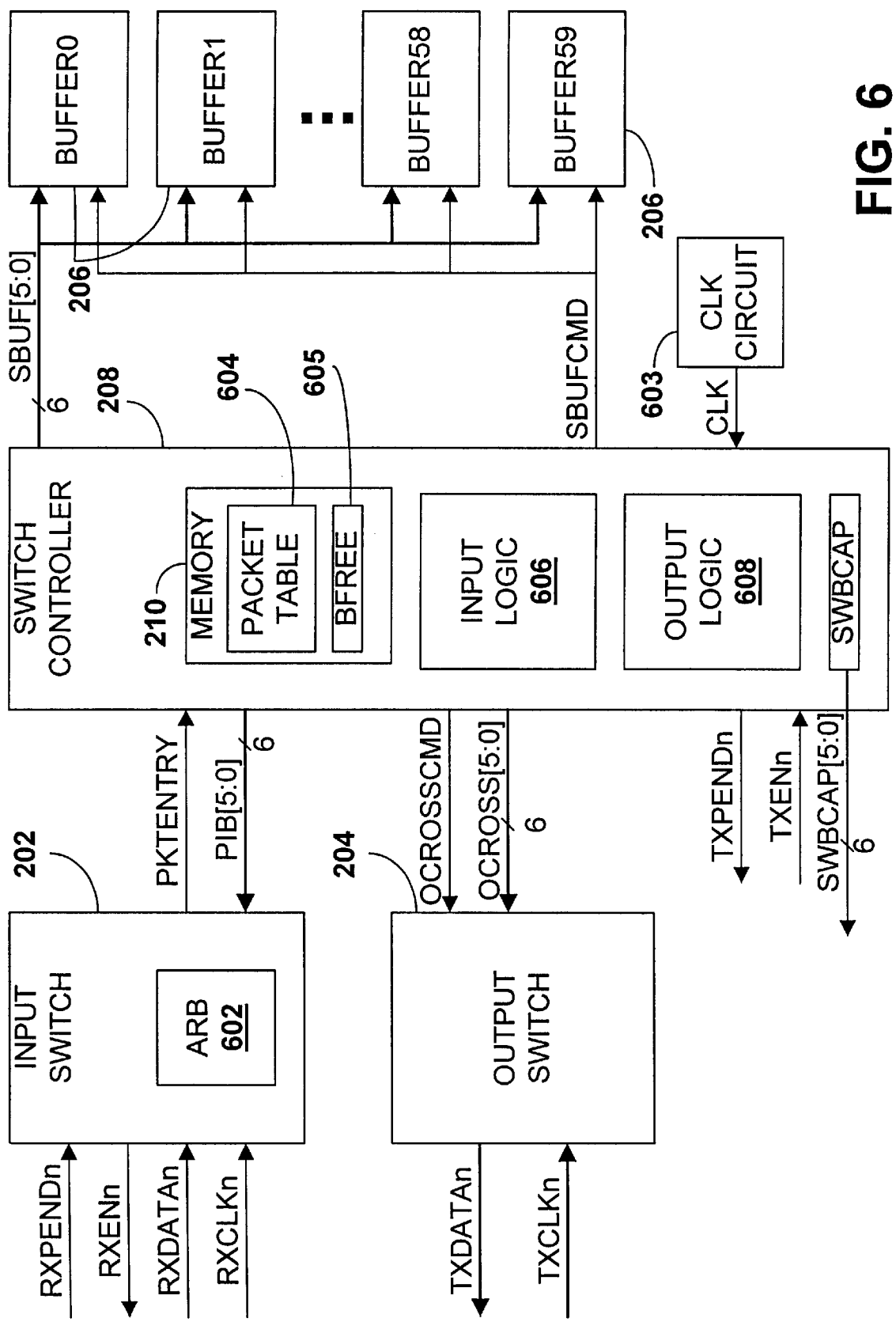
FIG. 6 is a more detailed block diagram of the interface and control signals between the input and output switches, the switch controller and each of the packet buffers of FIG. 2.

Referring now to FIG. 6, a more detailed block diagram is shown of the interface and control signals between the input and output switches 202, 204 of the switch matrix 200, the switch controller 208 and each of the packet buffers 206. The data signals IBUFm and OBUFm are not shown in FIG. 6 for purposes of clarity, but are shown in FIG. 2. The input switch 202 includes a receive data arbiter 602, which receives an RXPENDn signal from each of the ioports 104 indicating that the port has a pending packet to send to the switch matrix 200. Thus, IOPORT1 asserts a signal RXPEND1 to indicate it has a pending input packet, IOPORT2 asserts a signal RXPEND2 to indicate it has a pending input packet, etc. Each of the ioports 104 keeps its respective RXPENDn signal asserted until after the packet is sent. The arbiter 602 scans all of the RXPENDn signals and asserts a corresponding receive enable signal RXENn to the requesting ioport 104 asserting its RXPENDn signal, or IOPORTn, to initiate transfer of the packet. The data from each of the ioports 104 is provided to the input switch 202 on a corresponding data signal RXDATAn at a rate identified by a corresponding receive clock signal RXCLKn. For example, in response to a signal RXEN10 being asserted by the input switch 202, IOPORT10 asserts an input packet on a signal RXDATA10, one bit at a time, and accordingly toggles a clock signal RXCLK10 with each bit. This establishes a separate receive data channel between each of the ioports 104 and the input switch 202.

The switch controller 208 receives a master clock signal CLK from a clock circuit 603 for synchronizing data flow and transfers. Although not explicitly shown, the CLK signal is used by circuitry and logic described herein for purposes of synchronization. The switch controller 208 includes input logic 606 for controlling the transfer of input packets from the ioports 104 to the packet buffers 206. The input logic 606 searches a BFREE register 605 in the memory 210 for the buffer number (m) of the next free packet buffer 206, or BUFFERM. The input logic 606 then asserts the equivalent binary buffer number on six buffer number signals SBUF[5:0] and asserts a buffer command signal SBUFCMD to prepare the next free packet buffer 206 to receive an input packet. In the embodiment shown, each of the packet buffers 206 detects the SBUFCMD signal asserted and latches the binary number (m) asserted on the SBUF[5:0] signals. Each of the packet buffers 206 then compares the latched number (m) with its own physical number, and the indicated packet buffer 206 then monitors the duration of the SBUFCMD signal to determine the appropriate action. In particular, the SBUFCMD signal is asserted for two CLK cycles to command the indicated packet buffer to free itself after transmitting a packet for output. The SBUFCMD signal is asserted for three CLK cycles to command the indicated packet buffer to begin transmitting a packet for output. The SBUFCMD signal is asserted for four CLK cycles to command the indicated packet buffer to prepare for an input packet from the input switch 202. Thus, the input logic 606 asserts the SBUFCMD for four CLK cycles to command the next free packet buffer BUFFERM to receive the next input packet.

The input logic 606 also asserts the binary equivalent of the number (m) of the next free packet buffer 206 on present input buffer signals PIB[5:0] to the input switch 202. When an input packet is available for transfer as indicated by an RXPENDn signal being asserted, the input switch 202 establishes a crosspoint connection between the corresponding RXDATAn signal and the IBUFm signal of the corresponding free BUFFERM identified by the number (m) asserted on the PIB[5:0] signals. The input switch 202 then asserts the RXENn signal to indicate to the IOPORTn asserting its RXPENDn signal to send its packet, and in response to the assertion of the RXENn signal, the IOPORTn sends the packet. The input switch 202 detects the leading edge of the packet, which is the PREPEND[15] lead bit, and then latches the next PREPEND[14:10] bits defining the prepended output port number OPNUM from the packet stream. The input switch 202 toggles a signal PKTENTRY to the switch controller 208 to transmit the OPNUM. In this manner, the switch controller 208 corresponds the PIB[5:0] number of the buffer where the packet is to be stored with the output port number OPNUM, which indicates the ioport 104 where the packet is to be sent. Optionally, the input switch 202 also latches the PREPEND[9:8] bits defining the priority level of the input packet, and correspondingly toggles the PKTENTRY signal. The switch controller 208 further includes a 6-bit packet buffer capacity SWBCAP counter 607, which stores a binary number asserted on SWBCAP[5:0] signals representing the number of the packet buffers 206 containing data packets. The input logic 606 increments the SWBCAP counter 607 with each new input packet.

After IOPORTn has finished sending the packet, it negates its RXPENDn signal. The input switch 202 respondingly negates the RXENn signal, and then performs a crosspoint clear process by clearing the crosspoint connection between the RXDATAn signal and the IBUFM signal. In this manner, the input switch 202 need only make and break the crosspoint connection, and does not need to know or otherwise measure the length of the packet.

The memory 210 is implemented as random access memory (RAM), such as static RAM (SRAM) or dynamic RAM (DRAM), or any other type of suitable memory device for storage and retrieval of data during operation. In the embodiment shown, the memory 210 is 8 kilobytes (Kbytes) and is organized into 128 blocks, where each block includes 64 bytes. In a first embodiment supporting priority levels, the blocks 127 - 105 are not used, and the remaining blocks are allocated to form a cross reference packet table 604 between the packet buffers 206 and the ioports 104 according to the following Table IIIA:

TABLE IIIA

ORGANIZATION OF PACKET TABLE 604

| BLOCK NUMBER | PORT NUMBER | PRIORITY LEVEL |
| --- | --- | --- |
| 104 | 26 | 3 |
| 103 | 26 | 2 |
| 102 | 26 | 1 |
| 101 | 26 | 0 |
| 100 | 25 | 3 |
| 99 | 25 | 2 |
| ... | ... | ... |
| 6 | 2 | 1 |
| 5 | 2 | 0 |
| 4 | 1 | 3 |
| 3 | 1 | 2 |
| 2 | 1 | 1 |
| 1 | 1 | 0 |
| 0 | BFREE 605 | N/A | where "block" identifies the data location within the memory 210, "port" identifies the port number of the output port, and priority indicates the relative priority of information stored therein. The last BLOCK 0 is used to store the BFREE register 605 indicating which of the packet buffers 206 are free or contain data packets. In a second embodiment not supporting priority levels, blocks 127 - 27 are not used, and the remaining blocks are allocated to form a cross reference packet table 604 between the packet buffers 206 and the ioports 104 according to the following Table IIIB:

TABLE IIIB

ALTERNATIVE ORGANIZATION OF PACKET TABLE 604

| BLOCK NUMBER | PORT NUMBER |
| --- | --- |
| 26 | 26 |
| 25 | 25 |
| 24 | 24 |
| 23 | 23 |
| 22 | 22 |
| 21 | 21 |
| ... | ... |
| 6 | 6 |
| 5 | 5 |
| 4 | 4 |
| 3 | 3 |
| 2 | 2 |
| 1 | 1 |
| 0 | BFREE 605 |

Each block is formatted according to the following Table IV, except that if priority is not used or not supported, byte number 3 is not used:

TABLE IV

CONTENTS OF DATA BLOCKS WITHIN THE PACKET TABLE 604

| Byte Number | Contents | Description |
| --- | --- | --- |
| 4–63 | SBUFNUM | Circular buffer containing one packet buffer number (m) per byte location, where the BUFFERm has data for the corresponding output port. |
| 3 | BLKSTAT (optional priority level information) | Block status for the 4 blocks associated with the corresponding output port: bit3: P3Q = priority 3 block has queued packets. bit2: P2Q = priority 2 block has queued packets. bit1: P1Q = priority 1 block has queued packets. bit0: P0Q = priority 0 block has queued packets. |
| 2 | TIMESTAMP | |
| 1 | RPTR | Read pointer to packet buffer 206 containing data |
| 0 | WPTR | Write pointer to packet buffer 206 to receive data |

Each of the packet buffers 206 includes enough memory to contain one packet of data having a maximum size, since packet size varies. Ethernet packet sizes may be as large as 1,500 bytes, whereas Token Ring packet sizes may be as large as 17,960 bytes or more. Token Ring networks generally provide a network parameter to set the maximum packet size. In the embodiment shown, however, each of the packet buffers 206 include 4 Kbytes of memory, thereby limiting packet size to a maximum of 4 Kbytes. The circular buffer within each of the blocks includes 60 bytes, each byte for storing a buffer number SBUFNUM, ranging from 0 to m, to point to one of the packet buffers 206, if necessary, containing data packets for the associated output port. Thus, each circular buffer forms a first-in, first-out (FIFO) pointer list for a particular IOPORTn to ensure the data packets are output to the port in received order. The write pointer WPTR points to the last byte location of the pointer list, and is modified or "incremented" to point to any further packet buffers 206 containing new input packets. The read pointer RPTR points to the first byte location of the pointer list for outputting the packets in FIFO order. If WPTR=RPTR for a given IOPORTn, then the circular buffer for that particular IOPORTn is empty and there is no data pending for output by that port.

The switch controller 208 includes output logic 608 for controlling the transfer of pending output packets from the packet buffers 206 to the ioports 104. The output logic 608 asserts a signal TXPENDn to the corresponding IOPORTn when a pending packet is stored in one of the packet buffers 206 for that IOPORTn. Each of the ioports 104 asserts a corresponding transmit enable signal TXENn in response to its TXPENDn signal being asserted, thereby indicating that it is ready to receive the pending packet. Again, there are 26 TXPENDn and 26 TXENn signals, one each for each of the ioports 104 and one each for the processors 212 and 214. In response to the TXENn signal being asserted, the output logic 608 identifies the BUFFERM holding the next packet for the IOPORTn asserting the TXENn signal, negates the TXPENDn signal, and asserts the appropriate binary numbers on output crosspoint signals OCROSS[5:0]. Also, the output logic 608 asserts an output crossbar command signal OCROSSCMD to make the appropriate output crosspoint connection between BUFFERm and IOPORTn through corresponding signals OBUFm and TXDATAn.

In particular, a binary number indicating the packet buffer 206 or BUFFERm holding the packet for output is asserted on the OCROSS[5:0] signals to the output switch 204, and the OCROSSCMD is asserted. During a first cycle of CLK, the output switch 204 detects the assertion of the OCROSS-CMD signal and latches the buffer number (m) from the OCROSS[5:0] signals. In the next CLK cycle, a binary number indicating the output port number (n) of IOPORTn is asserted on the OCROSS[5:0] signals, which signals are latched by the output switch 204. In the third CLK cycle, the output switch 204 samples the OCROSSCMD signal to determine whether a make or break command is being sent. If the OCROSSCMD signal is asserted for only two CLK cycles, then a break process occurs where the output switch 204 respondingly breaks the connection between OBUFm and TXDATAn. If the OCROSSCMD signal is asserted for three CLK cycles, then a connection process occurs where the output switch 204 respondingly establishes a crosspoint connection between OBUFm and TXDATAn.

The output logic 608 then asserts the buffer number (m) on the SBUF[5:0] signals and asserts the SBUFCMD for three CLK cycles to command the identified BUFFERm to initiate data transfer. It is noted that the particular timing between the SBUF and OCROSS signals may be implemented in any desired manner to establish the connection and initiate the output data packet transfer as long as the connection is made before actual data transfer begins. The output logic 608 also decrements the SWBCAP value stored in the SWBCAP counter 607 for each packet output to an ioport 104.

The output switch 204 transfers output data packet from the BUFFERm on the OBUFm signal to the TXDATAn signal of the corresponding IOPORTn. The IOPORTn toggles a corresponding transmit clock signal TXCLKn to the output switch 204 to enable IOPORTn to control the rate of transfer of the output packet. IOPORTn then negates its TXENn signal when the transfer of the output data packet is completed. The output logic 608 detects the negation of the TXENn signal, and then asserts the packet buffer and output port numbers on the OCROSS[5:0] signals and asserts the OCROSSCMD signal for two CLK cycles to command the output switch 204 to break the crosspoint connection, as described previously. In a similar manner, the output logic 608 then asserts the packet buffer number (m) on the SBUF[5:0] signals to identify the BUFFERM, and then asserts the SBUFCMD signal for two CLK cycles to command the indicated BUFFERm to free itself for another packet of data.

The general process of receiving and storing an entire packet before retransmitting the packet for output is referred to as store-and-forward operation. Cut-through operation is also supported, where after a connection is established between an IOPORTn and a BUFFERM for receiving an input packet, that BUFFERM begins transmitting through the output switch 204 to another IOPORT before receipt of the end of packet if instructed to do so by the switch controller 208.

Figure 7A:
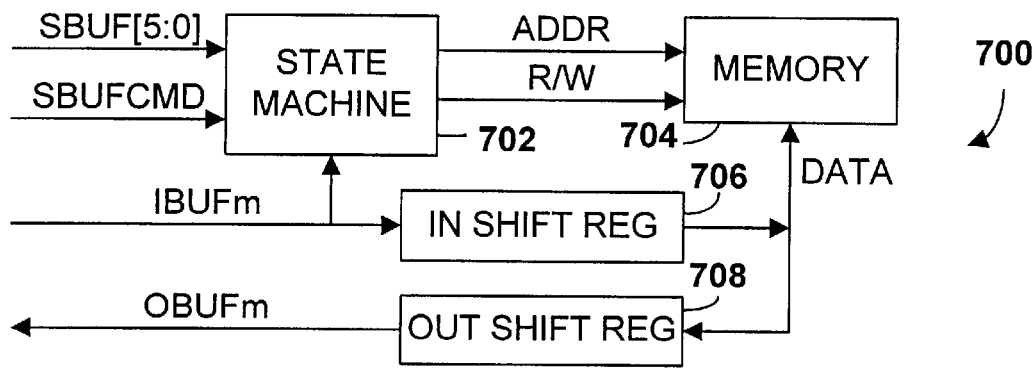
FIGS. 7A and 7B are schematic diagrams showing alternative implementations of the packet buffers of FIG. 6.
Figure 7B:
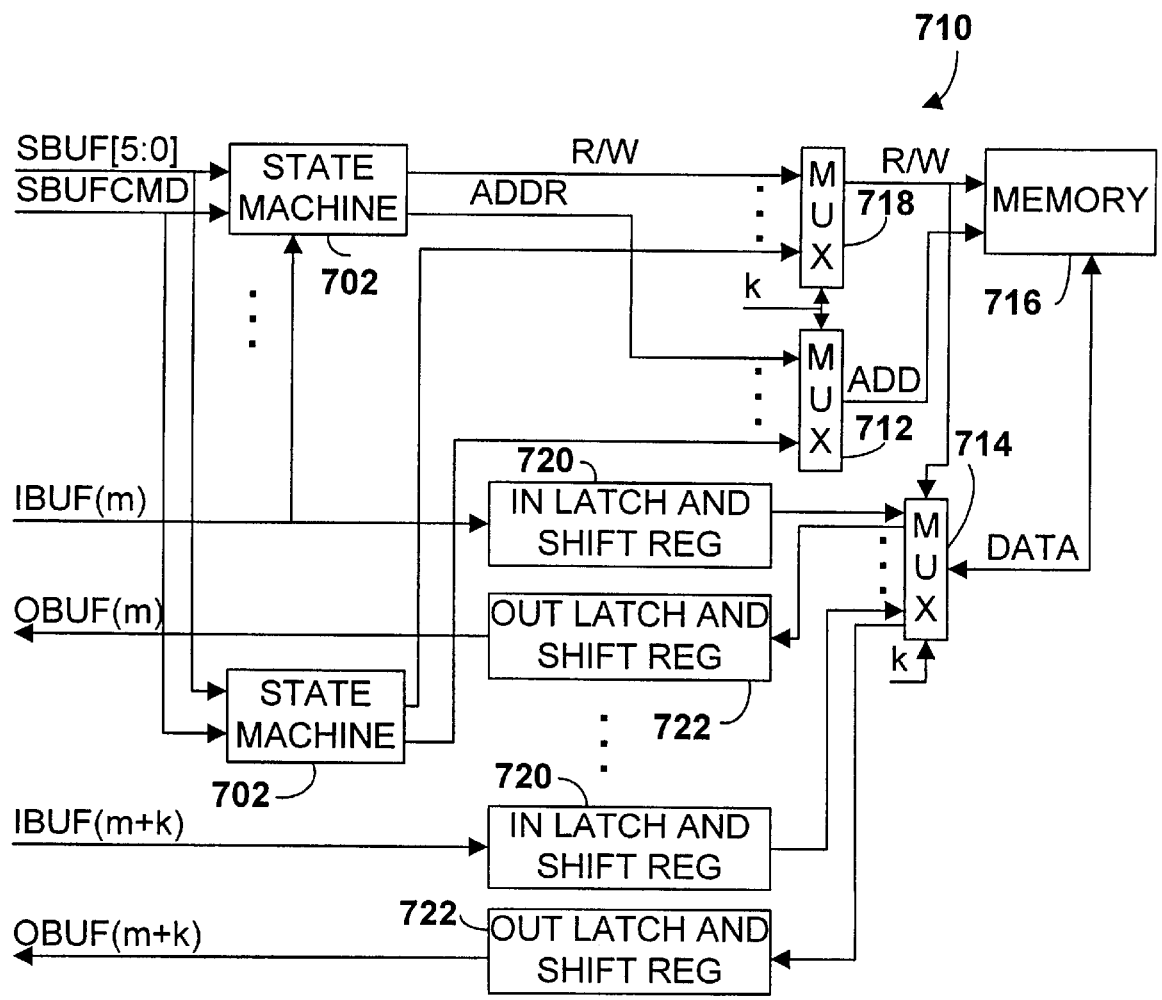

FIGS. 7A and 7B are schematic diagrams showing alternative implementations of the packet buffers 206. In FIG. 7A, a packet buffer 700 is shown for supporting one packet per BUFFERm. The IBUFm, SBUFCMD and SBUF[5:0] signals are provided to the inputs of a state machine 702, which detects assertions of the SBUFCMD, latches the SBUF[5:0] bits and then monitors the SBUFCMD to determine the appropriate action. The state machine 702 asserts an address to the address input of a memory 704 for addressing individual bits of the packet, and asserts a read/write signal R/W indicating either input to or output from the memory 704. The data bits asserted on the IBUFm signal are also provided to an input shift register 706, which provides data bits one at a time to the data input of the memory 704. The memory 704 asserts output data bits to the input of an output shift register 708, which asserts the data bits on the OBUFm signal.

In FIG. 7B, a packet buffer 710 is shown for supporting multiple or k packets per BUFFERm, where k is any desired integer ranging from depending upon buffer size and available size of a memory 716. For example, 32K by 8 SRAMs are commonly available, and if packet length is limited to a maximum size of 4 Kbytes, then 8 packets per BUFFERM is supported as long as the data rate of the IBUFM and OBUFM signals is less than the access time of the memory 716. For 8 packets per BUFFERM, k ranges from 1 to 8 to identify individual packet inputs and outputs. Thus, the SBUF[5:0], SBUFCMD and a respective one of k data input signals IBUF(m) to IBUF(m+k) are provided to respective inputs of k state machines 702. For example, the first state machine 702 receives an IBUF(m) signal, the second receives an IBUF (m+1) signal, . . . , the last receives an IBUF (m+k) signal. The k outputs of the k state machines 702 are provided to a k-input multiplexer (mux) 712, which receives the integer k as a select input for asserting a selected memory address at its output to the memory 716. Each of the state machines 702 also asserts a corresponding R/W signal to k inputs of another k-input mux 718 receiving k as its select input, where the selected R/W signal is provided to the R/W input of the memory 716.

The respective IBUF(m) to IBUF(m+k) input signals are also provided to the inputs of k input latch and shift registers 720, which assert outputs to respective inputs of a k-input and k-output bidirectional mux 714. The mux 714 receives k as a select input and the R/W signal from the mux 718 indicating direction of data flow. The mux 714 has k outputs provided to respective inputs of k output latch and shift registers 722, which assert outputs on k respective output signals OBUFm to OBUF(m+k).

Figure 8:
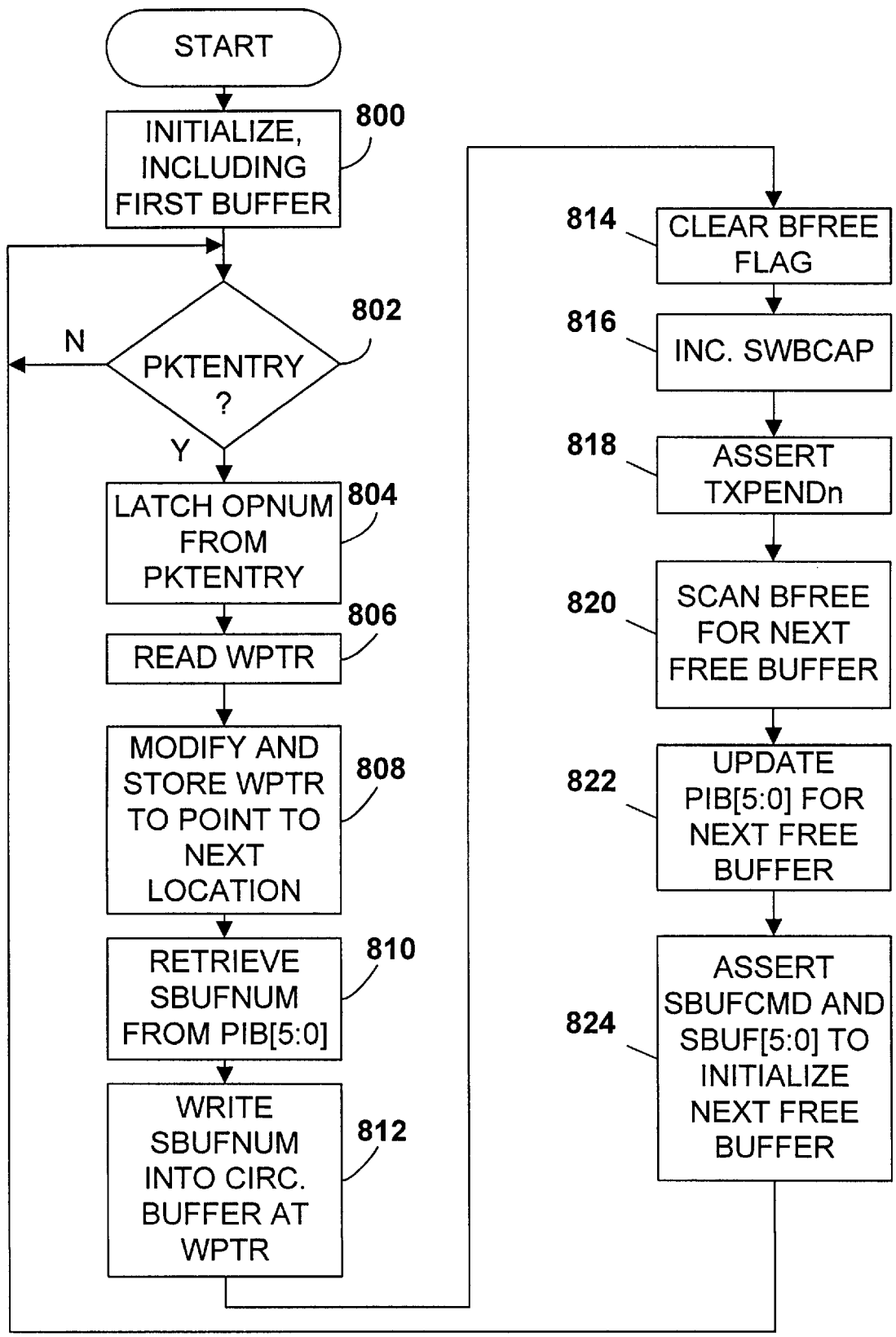
FIG. 8 is a flowchart diagram illustrating operation of the input logic shown in FIG. 6 for controlling input packet flow.

Referring now to FIG. 8, a flowchart diagram is shown illustrating operation of the input logic 606 for controlling input packet flow. The input logic 606 may be implemented in any suitable manner as known to those skilled in the art, such as a state machine triggered on the PKTENTRY signal. In a first step 800, the input logic performs initialization, including preparing the first BUFFER0 to receive data. The input logic 606 then periodically monitors the PKTENTRY signal in next step 802, which is asserted when a new packet is being provided from the input switch 202. Operation remains in step 802 until the PKTENTRY signal is asserted. When the PKTENTRY signal is asserted, operation proceeds to next step 804, where the OPNUM asserted on the PKTENTRY signal is latched or otherwise captured. Also, priority information is captured in step 804 if supported. Operation then proceeds to step 806, where the WPTR write pointer is retrieved from the block in the packet table 604 of the memory 210 corresponding to the OPNUM. If priority is supported, then the WPTR pointer of the indicated priority is retrieved. The WPTR value is then modified to point to the next available location in the circular buffer, and the modified WPTR is stored into the block in a next step 808.

In next step 810, the SBUFNUM buffer number (m) indicating the next free packet buffer 206 BUFFERm is retrieved from the PIB[5:0] signals. SBUFNUM is then written into the first location pointed to by WPTR of the circular buffer of the corresponding block in next step 812. Then, operation proceeds to next step 814, where the BFREE flag associated with the freed buffer BUFFERm is cleared indicating that BUFFERM contains data. The SWB-CAP counter 607 is incremented in next step 816. In next step 818, the TXPENDn signal corresponding to OPNUM is asserted to inform the IOPORTn that data is pending for output for that port. The input logic 606 then scans the BFREE register 605 to find the next free packet buffer 206 in next step 820. Then, the PIB[5:0] bits are updated with the number of the next free packet buffer 206 for the next packet of data in next step 822. Finally, the next free buffer number is asserted on the SBUF[5:0] signals and the SBUFCMD signal is asserted for four CLK signals to command the next free packet buffer 206 indicated by SBUF[5:0] to prepare to receive the next input packet. Operation then returns to step 802 to monitor the PKTENTRY signal for the next packet.

Referring now to FIGS. 9A and 9B, two flowchart diagrams are shown illustrating operation of the output logic 608. The output logic 606 may be implemented in any suitable manner as known to those skilled in the art, such as a state machine triggered on rising and falling edges of the TXENn signals. Two flowcharts illustrate concurrent operations within the output logic 606. In step 900 of FIG. 9A, each of the TXENn signals corresponding to TXPENDn signals being asserted are periodically sampled to determine if a rising edge occurs. If not, operation loops back to step 900. An alternative to such periodic polling is an interrupt generated in response to a rising edge of the TXENn signals. If any of the TXENn signals are asserted high by an IOPORTn, operation proceeds to next step 904, where the corresponding TXPENDn signal is negated. Operation proceeds to next step 906, where the RPTR read pointer is retrieved from the block in the packet buffer table 604 corresponding to the IOPORTn asserting the TXENn signal.

The SBUFNUM value pointed to by RPTR in the circular buffer of the block is retrieved in next step 908, which is the buffer number of the BUFFERm holding a pending packet for output to the port asserting the TXENn signal. In next step 910, the OCROSS[5:0] signals are asserted with and the buffer number (m) of the packet buffer 206 holding the pending packet, and the OCROSSCMD signal is asserted. Then, the OCROSS[5:0] signals are asserted with the output port number (n) of IOPORTn, the destination port. The output switch 204 responsively sets a crosspoint connection to connect the corresponding OBUFm and TXDATAn signals between the indicated packet buffer 206 and the output IOPORTn. In next step 912, the SBUF[5:0] bits are asserted by the switch controller 208 to identify the BUFFERm, and the SBUFCMD signal is asserted for 3 CLK cycles to command the indicated packet buffer 206 to begin transmitting data. Once the crosspoint connection is established and data transfer is initiated, operation proceeds to next step 913 to decrement the SWBCAP counter 607, and then operation loops back to step 900 to determine the next rising edge of any of the TXENn signals. Once a crosspoint connection is established, the switch controller 208 is immediately free to coordinate the next crosspoint connection.

In FIG. 9B, if any of the TXENn signals is high and then negated by an IOPORTn indicating data transfer has completed, operation proceeds from step 902 to step 914, where the read pointer RPTR is retrieved from the block corresponding to the IOPORTn. In next step 916, the SBUFNUM of the BUFFERm pointed to by RPTR is retrieved. The switch controller 208 then asserts the OCROSS[5:0] bits and the OCROSSCMD signal to clear the crosspoint connection in the output switch 204 in next step 918. In next step 920, the switch controller 208 asserts the SBUF[5:0] bits and the SBUFCMD signal to command the indicated BUFFERm to free itself for a new input packet. Operation proceeds to step 922, where the WPTR write pointer is retrieved to determine pointer action. Then, the RPTR read pointer is modified in next step 924 in the corresponding block of the packet table 604 to point to the next location in the circular buffer. In next decision step 926, the RPTR and WPTR pointers are compared to determine if the circular buffer is empty or contains any more data. If the circular buffer is empty where RPTR=WPTR, the RPTR and WPTR pointers are cleared or otherwise reset in step 928 to mark the circular buffer as empty. From step 928, operation loops back to step 902. If RPTR and WPTR are not equal as determined in step 926, then the corresponding TXPENDn signal is re-asserted in next step 930, and operation loops back to step 902 to poll the TXENn signals.

Figure 10:
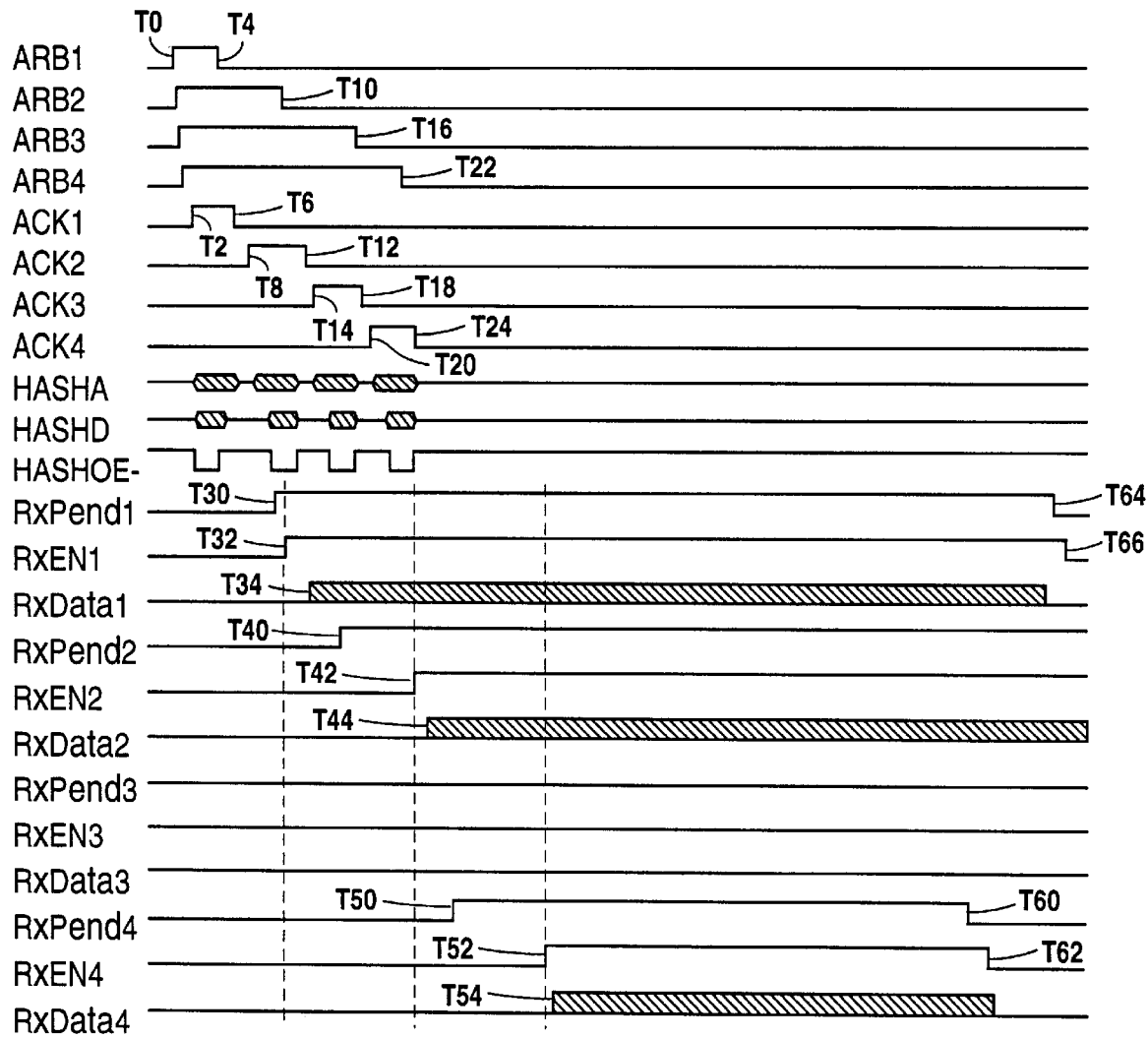
FIG. 10 is a timing diagram illustrating data packet transfer timing of input packets from the ports to the input switch of FIG. 2.

Referring now to FIG. 10, a timing diagram is shown illustrating data transfer timing of input packets from the ioports 104 to the input switch 202. At approximately time T0, the ARB1, ARB2, ARB3 and ARB4 signals are asserted by IOPORT1, IOPORT2, IOPORT3 and IOPORT4, respectively, indicating packets have been received by these input ioports 104. The ioports 104 continue to assert their corresponding ARBn signals until after they have gained control of the hash bus 218 and retrieve data from the hash memory 217. The Arbiter 500 asserts the ACK1 signal at subsequent time T2 granting control of the hash bus 218 to IOPORT1. Between time T2 and a subsequent time T4, IOPORT1 asserts a hashed address to the hash memory 217, which responds with hash data including an output port number. IOPORT1 receives and latches the hash data from the hash bus 218, and negates the ARB1 signal at approximately time T4. The arbiter 500 respondingly negates the ACK1 signal at approximately time T6, and then asserts the ACK2 signal at approximately time T8 to grant control of the hash bus 218 to IOPORT2. IOPORT2 operates in a similar manner and retrieves hash data from the hash memory 217, and then negates the ARB2 signal at approximately time T10. The arbiter 500 respondingly negates the ACK2 signal at approximately time T12, and subsequently asserts the ACK3 signal at approximately time T14. IOPORT3 retrieves its hash data, negates the ARB3 signal at approximately time T16, and the arbiter 500 negates the ACK3 signal at approximately time T18 and grants control to IOPORT4 by asserting the ACK4 signal at time T20. IOPORT4 operates in a similar manner as IOPORTS 1–3 and completes at a subsequent time T22.

After IOPORT1 negates the ARB1 signal at time T4, it prepends information to the front of its packet and asserts the RXPEND1 signal at approximately time T30 to send data to the input switch 202. It is noted that time T30 is not necessarily subsequent to times T6, T8, T10, etc., and occurs as soon after time T4 that IOPORT1 is ready to send its packet. The input switch 202 subsequently asserts the RXEN1 signal at approximately time T32, and IOPORT1 sends data on the RXDATA1 signal to the input switch 202 beginning at approximately time T34. Meanwhile, after IOPORT2 negates the ARB2 signal and is ready to transmit its packet, IOPORT2 asserts the RXPEND2 signal at approximately time T40. At approximately time T42, after the input switch 202 has established a connection with IOPORT1 and is able to receive another packet, the input switch 202 asserts the RXEN2 signal. Subsequently at approximately time T44, IOPORT2 begins transmitting its packet to the input switch 202 on the RXDATA2 signal. IOPORT3 drops its packet and thus does not assert the RXPEND3 signal. At subsequent time T50 after time T22, IOPORT4 asserts the RXPEND4 signal to send its packet. The input switch 202 asserts the RXENn signal at subsequent time T52, and IOPORT4 begins sending its packet at approximately time T54 on the RXDATA4 signal.

The packet being sent by IOPORT4 is a relatively short packet, and its transmission completes at about time T60. IOPORT4 then negates the RXPEND4 signal at approximately time T60, and the input switch 202 respondingly negates the RXEN4 signal at approximately time T62 indicating transfer is completed. In a similar manner, IOPORTS 1 and 2 finish sending their respective packets and negate their corresponding RXPENDn signals, and the input switch 202 respondingly negates the corresponding RXENn signals.

Figure 11:
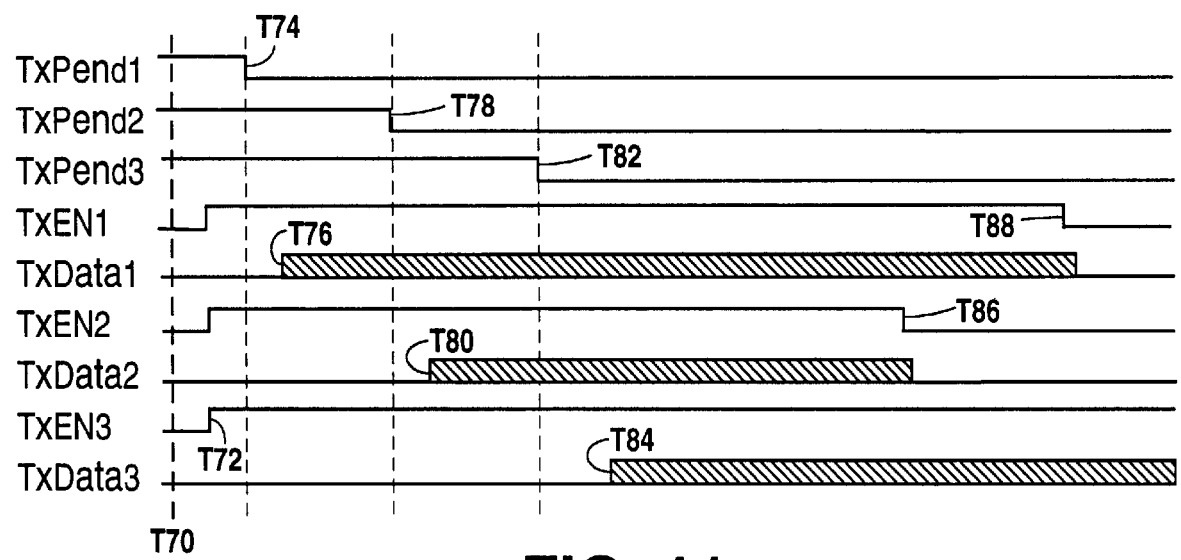
FIG. 11 is a timing diagram illustrating data packet transfer timing between the output switch and the ports of FIG. 2.

Referring now to FIG. 11, a timing diagram is shown illustrating data packet transfer timing between the output switch 204 and the ioports 104. At an initial time T70, the TXPEND1, TXPEND2 and TXPEND3 signals are all asserted by the switch controller 208 indicating that packets are pending for these ports. The corresponding TXEN1, TXEN2 and TXEN3 signals are initially negated at time T70. At approximately time T72, the TXEN1, TXEN2 and TXEN3 signals are asserted by IOPORTS 1–3, respectively. Simultaneous assertion of these signals is arbitrary and shown for only purposes of explanation. The output switch 204 establishes a crosspoint connection for IOPORT1, and the switch controller 208 then negates the TXPEND1 signal at approximately time T74 indicating a packet is to be transferred to IOPORT1. The packet is transferred on the TXDATA1 signal from a packet buffer 206 beginning at time T76. Eventually the output switch 204 establishes a crosspoint connection for IOPORT2 and the switch controller 208 negates the TXPEND2 signal at approximately time T78. A packet is sent through the output switch 204 on the TXDATA2 signal beginning at time T80. Then, a crosspoint connection is made for IOPORT3, and the switch controller 208 negates the TXPEND3 signal at approximately time T82. The output switch 204 then transmits a packet on the TXDATA3 signal beginning at time T84.

Each of the IOPORTS 1–3 continues asserting its corresponding TXENn signal until after the packet is completely transferred. For example, IOPORT2 negates the TXEN2 signal at approximately time T86 after it detects the end of the packet on TXDATA2. The output logic 608 subsequently detects another packet for IOPORT2, and asserts the TXPEND2 signal again at time T88.

It is now appreciated that a network switch according to the present invention provides improved switching fabric. A switching network provides a data path between each I/O port and a plurality of packet buffers, so that the packet buffers are centrally located and not associated with only particular input or output ports. The packet buffers are available on a first-come, first-served basis to all of the ports. The switching fabric includes control logic and memory for tracking the packets stored in the packet buffers for each output port. The I/O ports include logic for prepending the output or destination port for each packet, which prepended information is intercepted by the control logic for tracking purposes. A packet processor handles new addresses and also handles packets to be duplicated, such as multicast and broadcast packets. The packet processor is coupled to the switching network in a similar manner as the I/O ports, where multicast and broadcast packets and packets with new addresses are simply routed to the packet processor. The packet processor updates an address table and duplicates the packet to each of the appropriate output ports by prepending the information to the packets.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A network switch including shared packet buffers for transferring data packets, comprising:
   a plurality of input/output network ports;
   a plurality of shared packet buffers;
   a switch matrix coupled to said plurality of network ports and to said plurality of packet buffers that provides an independent input data channel and that provides an independent output data channel between any one of said plurality of network ports and any one of said plurality of packet buffers; and
   a switch controller coupled to said switch matrix and said plurality of packet buffers for controlling transfer of data packets between said plurality of network ports and said plurality of packet buffers.

2. The network switch of claim 1, wherein said switch matrix includes a plurality of programmable input channel connections for providing at least two simultaneous input data channels and at least two simultaneous output data channels.

3. The network switch of claim 2, wherein said switch matrix comprises:
   an input switch having a plurality of inputs coupled to respective outputs of said plurality of network ports, a plurality of outputs coupled to respective inputs of said plurality of packet buffers and a plurality of programmable crosspoints; and
   an output switch having a plurality of inputs coupled to respective outputs of said plurality of packet buffers, a plurality of outputs coupled to respective inputs of said plurality of network ports and a plurality of programmable crosspoints.

4. The network switch of claim 1, wherein each of said plurality of packet buffers stores only one data packet at a time.

5. The network switch of claim 1, wherein said switch controller further comprises:
   input logic coupled to said plurality of packet buffers for controlling transfer of input data packets, wherein said input logic determines a free one of said plurality of packet buffers and asserts a corresponding buffer number.

6. The network switch of claim 5, wherein:
   each of said plurality of network ports indicates a received data packet and prepends an output port number to said received data packet; and
   wherein said switch matrix receives said buffer number of said free one of said plurality of packet buffers and establishes a data channel between one of said plurality of network ports indicating a received data packet and said free one of said plurality of packet buffers.

7. The network switch of claim 6, wherein:
   said switch matrix indicates to said one of said plurality of network ports indicating a received data packet to send said received data packet with said prepended output port number; and
   wherein said switch matrix receives said data packet, retrieves said output port number and provides said output port number to said input logic.

8. The network switch of claim 1, wherein said switch controller further comprises:
   output logic coupled to said plurality of packet buffers for determining if any of said plurality of packet buffers stores data for any one of said plurality of network ports, and for asserting a corresponding one of a plurality of transmit pending signals indicative thereof; and
   each of said plurality of network ports including logic for receiving a corresponding one of said plurality of transmit pending signals and for asserting a corresponding one of a plurality of enable signals indicating it is available to receive a data packet;
   wherein said output logic provides a port number to said switch matrix identifying one of said plurality of network ports and a buffer number identifying one of said plurality of packet buffers storing data for said one of said plurality of network ports, wherein said switch matrix establishes an output data channel between said one of said plurality of network ports and said one of said plurality of packet buffers.

9. The network switch of claim 8, wherein said output logic further includes logic for commanding each of said plurality of packet buffers to transmit a data packet.

10. The network switch of claim 1, wherein said switch controller further comprises:

memory including a packet table for storing buffer numbers corresponding to any of said plurality of packet buffers storing data for one of said plurality of network ports.

11. The network switch of claim 10, wherein said packet table is organized into blocks corresponding to each of said plurality of network ports, each of said blocks including a circular buffer implemented as a first-in, first-out circular buffer for storing said buffer numbers of said plurality of packet buffers holding data of corresponding ones of said plurality of network ports.

12. The network switch of claim 1, further comprising:

a hash memory coupled to said plurality of network ports for storing a table of network port numbers corresponding to hash addresses for said plurality of network ports.

13. The network switch of claim 12, wherein each of said plurality of network ports includes:

hash logic for converting a media access control address into a corresponding hash address; and logic for providing said hash address to said hash memory for retrieving a corresponding network port number.

14. The network switch of claim 1, further comprising:

a packet processor coupled to an input and an output of said switch matrix for sending data packets to, and for receiving data packets from, said switch matrix, wherein said packet processor receives data packets with new address and duplicates multicast and broadcast data packets.

15. A network system, comprising:

a plurality of network segments, each including at least one data device for sending and receiving data packets; and a network switch coupled to each of said plurality of network segments including shared packet buffers for transferring said data packets, comprising:

a plurality of input/output network ports, each for coupling to one of said plurality of network segments;

a packet processor;

a plurality of shared packet buffers;

an input switch device having a plurality of inputs coupled to corresponding ones of said plurality of network ports and said packet processor and a plurality of outputs coupled to corresponding ones of said plurality of packet buffers to provide an input data path between any of said plurality of network ports and any of said plurality of packet buffers and said packet processor; and an output switch device having a plurality of inputs coupled to corresponding ones of said plurality of packet buffers and a plurality of outputs coupled to corresponding ones of said plurality of network ports and said packet processor to provide an output data path between any of said plurality of packet buffers and any of said plurality of network ports and said packet processor; and a switch controller coupled to said input and output switch devices, said plurality of network ports and said packet processor for controlling transfer of packets between said plurality of network ports and said plurality of packet buffers and between said packet processor and said plurality of packet buffers.

16. The network system of claim 15, wherein said input and output switch devices each include a plurality of crosspoint connections for establishing independent input and output data channels, respectively, between any one of said plurality of network ports and said product processor and any one of said plurality of packet buffers.

17. The network system of claim 16, wherein said plurality of crosspoint connections of said input switch device enables at least two simultaneous input data channels, and wherein said said plurality of crosspoint connections of said output switch device enables at least two simultaneous output data channels.

18. The network system of claim 15, wherein said switch controller further comprises:

memory including a packet table for storing buffer numbers identifying any of said plurality of packet buffers holding data for any of said plurality of network ports; and input logic coupled to said plurality of packet buffers, said input switch device and said memory for determining which of said plurality of packet buffers are free to accept data, for asserting a corresponding free buffer number to said input switch device, for receiving an output port number and for updating said packet table with said free buffer number and said output port number.

19. The network system of claim 18, wherein said switch controller further comprises:

output logic coupled to said plurality of packet buffers, said output switch device and said memory for determining if any of said plurality of packet buffers stores a data packet for any one of said plurality of network ports, for retrieving a buffer number and a corresponding output port number identifying one of said plurality of network ports from said memory, and for providing said buffer number and corresponding output port number to said output switch logic.

20. The network system of claim 15, wherein said packet processor receives data packets with a new address and duplicates multicast and broadcast data packets.

21. A method of transferring a data packet by a network switch including a plurality of input/output network ports, a plurality of shared packet buffers and a switch matrix, comprising the steps of:

receiving a data packet from any one of the plurality of network ports for sending to any other one of the plurality of network ports of the network switch;

identifying an available packet buffer from all of the plurality of packet buffers;

establishing an input data channel in the switch matrix between said any one of the plurality of network ports and the available packet buffer;

sending the data packet to the available packet buffer on the input data channel for temporary storage;

determining when said any other one of the plurality of network ports is ready to receive the pending data packet;

establishing an output data channel in switch matrix between the packet buffer and said any other one of the plurality of network ports; and sending the pending data packet to said any other one of the plurality of network ports on the output data channel.

* * * * *